United States Patent
Ota et al.

(10) Patent No.: US 10,928,349 B2
(45) Date of Patent: Feb. 23, 2021

(54) METHOD FOR PRODUCING INSULATED ELECTRIC WIRE, METHOD FOR INSPECTING INSULATED ELECTRIC WIRE, AND APPARATUS FOR PRODUCING INSULATED ELECTRIC WIRE

(71) Applicants: SUMITOMO ELECTRIC INDUSTRIES, LTD., Osaka (JP); SUMITOMO ELECTRIC WINTEC, INC., Koka (JP)

(72) Inventors: Shinya Ota, Osaka (JP); Masaaki Yamauchi, Osaka (JP); Jun Sugawara, Koka (JP); Yasushi Tamura, Koka (JP); Kengo Yoshida, Koka (JP); Takao Inoue, Koka (JP); Hiroji Sugimoto, Koka (JP)

(73) Assignees: SUMITOMO ELECTRIC INDUSTRIES, LTD., Osaka (JP); SUMITOMO ELECTRIC WINTEC, INC., Shiga (JP)

( * ) Notice: Subject to any disclaimer, the term of this patent is extended or adjusted under 35 U.S.C. 154(b) by 0 days.

(21) Appl. No.: 16/339,933

(22) PCT Filed: Oct. 20, 2017

(86) PCT No.: PCT/JP2017/037953
§ 371 (c)(1),
(2) Date: Apr. 5, 2019

(87) PCT Pub. No.: WO2018/074577
PCT Pub. Date: Apr. 26, 2018

(65) Prior Publication Data
US 2020/0033286 A1    Jan. 30, 2020

(30) Foreign Application Priority Data

Oct. 20, 2016  (JP) ............................. JP2016-206330
Mar. 30, 2017  (JP) ............................. JP2017-069198
(Continued)

(51) Int. Cl.
*G01N 27/24*     (2006.01)
*H01B 13/16*     (2006.01)
(Continued)

(52) U.S. Cl.
CPC ............. *G01N 27/24* (2013.01); *G01B 7/085* (2013.01); *G01N 15/088* (2013.01); *H01B 13/0036* (2013.01); *H01B 13/16* (2013.01)

(58) Field of Classification Search
CPC ........................................................ G01N 27/24
See application file for complete search history.

(56) References Cited

U.S. PATENT DOCUMENTS

| 6,498,499 B1* | 12/2002 | Sikora | G01R 27/2605 |
| | | | 324/661 |
| 2012/0074955 A1* | 3/2012 | Brady | G01R 1/22 |
| | | | 324/551 |
| 2016/0163420 A1* | 6/2016 | Araya | H01B 7/292 |
| | | | 428/380 |

FOREIGN PATENT DOCUMENTS

| CN | 104391016 A | 3/2015 |
| JP | S58-026416 A | 2/1983 |

(Continued)

OTHER PUBLICATIONS

Search Report in the corresponding International Patent Application No. PCT/JP2017/037953 dated Nov. 14, 2017.

*Primary Examiner* — Austin Murata
(74) *Attorney, Agent, or Firm* — Global IP Counselors, LLP

(57) ABSTRACT

A method for producing an insulated electric wire includes a step of preparing a conductor having a linear shape; a step (Continued)

of forming an insulating coating so as to cover a surface on an outer peripheral side of the conductor to obtain an insulated electric wire that includes the conductor and the insulating coating covering the conductor; and a step of measuring a first electrostatic capacity between the insulated electric wire and a first electrode disposed outside in a radial direction of the insulated electric wire so as to face an outer peripheral surface of the insulated electric wire while transporting the insulated electric wire in a longitudinal direction of the conductor, and inspecting a formation state of the insulating coating, the formation state including a formation state of a defective portion in the insulating coating, on the basis of a change in the first electrostatic capacity.

20 Claims, 10 Drawing Sheets

(30) Foreign Application Priority Data

| Mar. 30, 2017 | (JP) | JP2017-069200 |
| Mar. 30, 2017 | (JP) | JP2017-069202 |
| Aug. 1, 2017 | (JP) | JP2017-149486 |

(51) Int. Cl.
  *G01B 7/06* (2006.01)
  *G01N 15/08* (2006.01)
  *H01B 13/00* (2006.01)

(56) References Cited

FOREIGN PATENT DOCUMENTS

| JP | H03-283208 A | 12/1991 |
| JP | H08-220184 A | 8/1996 |
| JP | H08-249958 A | 9/1996 |
| JP | H10-125151 A | 5/1998 |
| JP | 2005-123116 A | 5/2005 |
| JP | 2007-026909 A | 2/2007 |
| JP | 2012-224714 A | 11/2012 |
| JP | 2013-004399 A | 1/2013 |
| JP | 2016-081563 A | 5/2016 |
| JP | 2016-110847 A | 6/2016 |

* cited by examiner

METHOD FOR PRODUCING INSULATED ELECTRIC WIRE, METHOD FOR INSPECTING INSULATED ELECTRIC WIRE, AND APPARATUS FOR PRODUCING INSULATED ELECTRIC WIRE

CROSS-REFERENCE TO RELATED APPLICATIONS

This U.S. National stage application claims priority under 35 U.S.C. § 119(a) to Japanese Patent Application No. 2016-206330, filed in Japan on Oct. 20, 2016, Japanese Patent Application No. 2017-069198, filed in Japan on Mar. 30, 2017, Japanese Patent Application No. 2017-069200, filed in Japan on Mar. 30, 2017, Japanese Patent Application No. 2017-069202, filed in Japan on Mar. 30, 2017, and, Japanese Patent Application No. 2017-149486, filed in Japan on Aug. 1, 2017, the entire contents of each of these applications being hereby incorporated herein by reference in their entirety.

TECHNICAL FIELD

The present invention relates to a method for producing an insulated electric wire, a method for inspecting an insulated electric wire, and an apparatus for producing an insulated electric wire.

The present application claims priority from Japanese Patent Application No. 2016-206330 filed on Oct. 20, 2016, Japanese Patent Application No. 2017-69198 filed on Mar. 30, 2017, Japanese Patent Application No. 2017-69200 filed on Mar. 30, 2017, Japanese Patent Application No. 2017-69202 filed on Mar. 30, 2017, and Japanese Patent Application No. 2017-149486 filed on Aug. 1, 2017, and the entire contents of the Japanese patent applications are incorporated herein by reference.

BACKGROUND ART

Japanese Unexamined Patent Application Publication No. 8-220184 (PTL 1) discloses a method for detecting a crack formed on an insulating coating of an insulated electric wire by optically inspecting the state of the insulating coating.

Japanese Unexamined Patent Application Publication No. 8-249958 (PTL 2) discloses a method for producing a foamed insulated electric wire, the method including a series of steps of injecting a gas for foaming into a molten thermoplastic resin and coating a conductor with the resulting foamed resin insulator by extrusion to form a foamed insulated electric wire; introducing the formed foamed insulated electric wire into a water tank having a moving water tank that is movable; and monitoring, with an electrostatic capacity meter, an electrostatic capacity of the foamed insulated electric wire cooled in the water tank.

Japanese Unexamined Patent Application Publication No. 2016-81563 (PTL 3) proposes, as an insulated electric wire that includes an insulating coating having a low dielectric constant, an insulated electric wire in which an insulating coating having pores is provided on a conductor.

Japanese Unexamined Patent Application Publication No. 2016-110847 proposes, as an insulated electric wire that includes an insulating coating having a low dielectric constant, an insulated electric wire in which an insulating coating having pores is provided on a conductor.

SUMMARY OF INVENTION

A method for producing an insulated electric wire of the present disclosure includes a step of preparing a conductor having a linear shape; a step of forming an insulating coating formed of an insulator so as to cover a surface on an outer peripheral side of the conductor to obtain an insulated electric wire that includes the conductor and the insulating coating covering the conductor; and a step of measuring a first electrostatic capacity between the insulated electric wire and a first electrode disposed outside in a radial direction of the insulated electric wire so as to face an outer peripheral surface of the insulated electric wire while transporting the insulated electric wire in a longitudinal direction of the conductor, and inspecting a formation state of the insulating coating, the formation state including a formation state of a defective portion in the insulating coating, on the basis of a change in the first electrostatic capacity.

DESCRIPTION OF EMBODIMENTS

Figure 1:
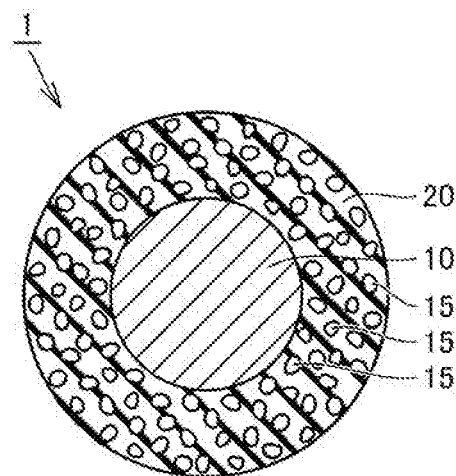
FIG. 1 is a schematic sectional view illustrating an example of an insulated electric wire inspected in Embodiment 1.

Problems to be Solved by Present Disclosure

In a production method or an inspection method of an insulated electric wire, it has been desired to appropriately detect a defective portion that can affect insulating properties of the insulated electric wire, in particular, a very small defective portion that is difficult to be correctly detected by visual inspection. Furthermore, in consideration of inspection efficiency, it has been desired to detect a defective portion in a non-destructive manner while transporting an insulated electric wire.

In view of this, one object is to provide a method for producing an insulated electric wire, the method being capable of appropriately detecting a defective portion that can affect insulating properties of an insulated electric wire, in particular, a very small defective portion in a non-destructive manner while transporting the insulated electric wire, and thereby capable of producing an insulated electric wire having a stable quality, an apparatus for carrying out the method, and a method for inspecting an insulated electric wire, the method being capable of appropriately detecting such a defective portion.

Advantageous Effects of Present Disclosure

According to the present disclosure, a defective portion that can affect insulating properties of an insulated electric wire, in particular, a very small defective portion can be appropriately detected in a non-destructive manner while transporting the insulated electric wire, and consequently, an insulated electric wire having a stable quality can be produced.

DESCRIPTION OF EMBODIMENTS OF PRESENT INVENTION

First, embodiments of the present invention will be listed and described. A method for producing an insulated electric wire of the present application includes a step of preparing a conductor having a linear shape; a step of forming an insulating coating so as to cover a surface on an outer peripheral side of the conductor to obtain an insulated electric wire that includes the conductor and the insulating coating covering the conductor; and a step of measuring a first electrostatic capacity between the insulated electric wire and a first electrode disposed outside in a radial direction of the insulated electric wire so as to face an outer peripheral surface of the insulated electric wire while transporting the insulated electric wire in a longitudinal direction of the conductor, and inspecting a formation state of the insulating coating, the formation state including a formation state of a defective portion in the insulating coating, on the basis of a change in the first electrostatic capacity.

The method for producing an insulated electric wire of the present application includes a step of inspecting a formation state of an insulating coating. In the step of inspecting a formation state of an insulating coating, the formation state of the insulating coating is inspected by utilizing the fact that an electrostatic capacity between an insulated electric wire and an electrode disposed outside in a radial direction of the insulated electric wire so as to face an outer peripheral surface of the insulated electric wire varies depending on the formation state of the insulating coating. In particular, when a defective portion is present in the insulating coating, the defective portion is detected. This inspection utilizes the fact that the electrostatic capacity between the insulated electric wire and the electrode varies with a change in the thickness and the dielectric constant of the insulating coating. When a defective portion is present in the insulating coating, the thickness and the dielectric constant of the insulated electric wire substantially change, and consequently, the value of the electrostatic capacity between the electrode and the insulating coating changes compared with that in a steady state. Accordingly, the formation state of the insulating coating is inspected on the basis of a change in the electrostatic capacity between the electrode and the insulated electric wire transported in the longitudinal direction of the conductor, and when a defective portion is present in the insulating coating, the presence thereof can be detected.

Specifically, with respect to an insulated electric wire that includes a linear conductor and an insulating coating provided on the outer peripheral side of the conductor, an electrode is disposed outside in the radial direction of the insulated electric wire so as to face the outer peripheral surface of the insulated electric wire, and the electrostatic capacity (capacitance) between the insulated electric wire and the electrode is measured while transporting the insulated electric wire in the longitudinal direction thereof. In this case, the electrostatic-capacity exhibits a steady state in a defect-free normal portion. In contrast, the electrostatic capacity changes when a defective portion such as a scratch, a hole, or a thin-wall portion (a portion having a thickness locally and significantly smaller than an average thickness of the insulating coating) is present in the insulating coating, or a low-porosity portion (a region where no pores are locally present or a region having a porosity that is locally and significantly lower than an average porosity of the insulating coating) is present in the insulating coating having pores therein. For example, when a thin-wall portion in which an insulating coating has a relatively small thickness due to bulging of the conductor is present, the electrostatic capacity between the insulated electric wire and the electrode increases. When a scratch or a hole is present on the insulating coating, the electrostatic capacity changes depending on the state of the scratch and the hole. By detecting the electrostatic capacity between the electrode and the insulated electric wire while transporting the insulated electric wire in the longitudinal direction of the conductor, and by inspecting the formation state of the insulating coating on the basis of a change in the obtained electrostatic capacity, the formation state of the insulating coating can be inspected, and when a defective portion is present, the defective portion can be detected with high accuracy.

In the step of inspecting the formation state of the insulating coating, the defective portion in the insulating coating, the defective portion having a length of 4 mm or less in the longitudinal direction of the conductor, may be detected. Such a very small defective portion may be overlooked by visual observation in an inspection performed while transporting an insulated electric wire in the longitudinal direction thereof. An appropriate selection of the electrode used in the inspection step in the production method enables a defective portion in the insulating coating, the defective portion having a length of 4 mm or less in the longitudinal direction of the conductor, to be detected with high accuracy. As a result, the frequency of an undetected case of a defective portion decreases.

A length of the first electrode in the longitudinal direction is preferably adjusted such that the defective portion in the insulating coating, the defective portion having a length of 4 mm or less in the longitudinal direction of the conductor, is detectable. When the electrode having this configuration is provided, a defective portion in the insulating coating, the defective portion having a small length in the longitudinal direction of the conductor, can be more reliably detected in the step of inspecting the formation state of the insulating coating. Specifically, the length of the electrode in the longitudinal direction of the conductor is preferably 10 mm or less.

In the step of inspecting the formation state of the insulating coating, the defective portion in the insulating coating, the defective portion having a length of 2 mm or less in the longitudinal direction of the conductor, may be detected. With this configuration, a finer defective portion can be detected with higher accuracy.

In the step of obtaining the insulated electric wire, the insulating coating may be formed by applying a coating liquid so as to cover the surface on the outer peripheral side of the conductor to form a coating film and heating the coating film. The method for producing an insulated electric wire of the present application is particularly suitable for producing an insulated electric wire including such an insulating coating.

The insulating coating of the insulated electric wire may have a pore in the insulating coating. In this case, in the step of inspecting the formation state of the insulating coating, the formation state of the insulating coating may be inspected further on the basis of a relationship between the electrostatic capacity and a porosity.

Air has a dielectric constant of about 1.0. In contrast, the material constituting the insulating coating has a dielectric constant different from air. Accordingly, when pores are present in the insulating coating, the dielectric constant of the whole insulating coating changes depending on a ratio of the pores (porosity) that are present in the insulating coating. As a result of studies conducted by the inventors of the present invention, it has been found that there is a correlation between the porosity of the insulating coating and the electrostatic capacity (capacitance) between the electrode and the insulated electric wire. Therefore, in the method for producing an insulated electric wire of the present application, when pores exist in the insulating coating, a portion where the porosity is changed can be detected as a defective portion. Furthermore, the porosity of a portion where the porosity is changed can be derived by inspecting the formation state of the insulating coating on the basis of the relationship between the electrostatic capacity and the porosity in addition to the change in the electrostatic capacity.

The defective portion in the insulating coating may be a low-porosity portion that is present in the insulating coating having a pore therein. The method for producing an insulated electric wire of the present application is also suitable as a method for appropriately detecting a low-porosity portion that can be present in an insulating coating having a pore therein and that is unlikely to be detected by visual observation. The dielectric constant of the insulating coating changes in a portion where a low-porosity portion is present. Therefore, the electrostatic capacity between the insulated electric wire and the electrode varies in the portion where the low-porosity portion is present. The use of this phenomenon enables the low-porosity portion to be more efficiently detected in the method for producing an insulated electric wire. As described above, the term "low-porosity portion" refers to a region where no pores are locally present or a region having a porosity that is locally and significantly lower than an average porosity of the insulating coating. Among low-porosity portions, a region where no pores are locally present is particularly referred to as a pore-free portion.

The defective portion in the insulating coating may be a thin-wall portion. The method for producing an insulated electric wire of the present application is suitable as a method for appropriately detecting a thin-wall portion that is unlikely to be detected by visual observation. As described above, the term "thin-wall portion" refers to a portion having a thickness locally and significantly smaller than an average thickness of the insulating coating. Since the electrostatic capacity is inversely proportional to the thickness of the insulated electric wire, the presence of a thin-wall portion increases the electrostatic capacity between the insulated electric wire and the electrode. The use of this phenomenon enables the thin-wall portion to be efficiently detected in the method for producing an insulated electric wire.

The thin-wall portion may have an amount of decrease in a film thickness of 1 µm or more and 50 µm or less. Since such a thin-wall portion can be appropriately detected as a defective portion, the method can more effectively contribute to the production of an insulated electric wire having less defects.

In the method for producing an insulated electric wire, a product of a maximum length of the defective portion in a longitudinal direction and a maximum length of the defective portion in a width direction may be 0.1 mm$^2$ or more and 20 mm$^2$ or less in a planar shape when viewed in plan from a thickness direction of the insulating coating. Since a defective portion having such a size can be appropriately detected, the method can more effectively contribute to the production of an insulated electric wire having less defects. Hereinafter, the "maximum length of a defective portion in a longitudinal direction in a planar shape when viewed in plan from a thickness direction of the insulating coating" and the "maximum length of a defective portion in a width direction in a planar shape when viewed in plan from a thickness direction of the insulating coating" are referred to as a "maximum length in a longitudinal direction" and a "maximum length in a width direction", respectively.

The first electrode may include a plurality of units which are divided so as to be separated from each other in a circumferential direction of the conductor in a section perpendicular to the longitudinal direction of the conductor, and each of the units may extend in the longitudinal direction of the conductor. When the first electrode has such a shape, a position at which a defect is present can also be finely specified in the circumferential direction of the insulated electric wire.

In the step of inspecting the formation state of the insulating coating, the first electrostatic capacity between the first electrode and the insulated electric wire may be detected, a second electrostatic capacity between a second electrode and the insulated electric wire may be further detected, the second electrode being disposed outside in the radial direction of the insulated electric wire so as to face the outer peripheral surface of the insulated electric wire, and the formation state of the insulating coating may be inspected on the basis of at least one of a change in the first electrostatic capacity and a change in the second electrostatic capacity. By performing the inspection using a plurality of electrodes including the first electrode and the second electrode in this manner, false detection of a defect is reduced, and a defect can be detected with higher accuracy.

In the method for producing an insulated electric wire, a length of the second electrode in the longitudinal direction of the conductor may be different from that of the first electrode. In this case, a defect can be detected with higher accuracy by determining the first electrostatic capacity between the first electrode and the insulated electric wire and the second electrostatic capacity between the second electrode and the insulated electric wire and by comparing inspection results based on the electrostatic capacities (by determining the difference between the two electrostatic capacities).

The second electrode may include a plurality of units which are divided so as to be separated from each other in a circumferential direction of the conductor in a section perpendicular to the longitudinal direction of the conductor, and each of the units may extend in the longitudinal direction of the conductor. When the second electrode has such a shape, a position at which a defect is present can also be more finely specified in the circumferential direction of the insulated electric wire.

The insulating coating may contain polyimide. An insulating coating containing polyimide has good insulating properties and heat resistance. Therefore, polyimide is suitable as a material constituting the insulating coating. In addition, polyimide has a dielectric constant suitable for detecting a defect in the method for producing an insulated electric wire. Accordingly, the method for producing an insulated electric wire is suitable for producing an insulated electric wire that includes an insulating coating containing polyimide in a state where even if a defective portion is generated, the defective portion can be appropriately detected. The insulating coating may contain polyamide-imide. Since the insulating coating containing polyamide-imide has good insulating properties and durability as in the insulating coating containing polyimide, the insulating coating containing polyamide-imide has advantages similar to those in polyimide.

The step of inspecting the formation state of the insulating coating is preferably performed online. When the step of inspecting the formation state of the insulating coating is performed by online inspection, the production of an insulated electric wire can be continuously performed, and the insulated electric wire can be obtained with high production efficiency. The state in which the inspection is performed online means a state in which, in the series of production steps, the formation state of the insulating coating is continuously inspected subsequent to the step of obtaining the insulated electric wire.

A method for inspecting an insulated electric wire of the present application includes a step of preparing an insulated electric wire that includes a conductor having a linear shape and an insulating coating formed on an outer peripheral side of the conductor; and a step of measuring an electrostatic capacity between the insulated electric wire and an electrode disposed outside in a radial direction of the insulated electric wire so as to face an outer peripheral surface of the insulated electric wire while transporting the insulated electric wire in a longitudinal direction of the conductor, and inspecting a formation state of the insulating coating on the basis of a change in the electrostatic capacity. In the inspection method, a defective portion in the insulating coating, the defective portion having a length of 4 mm or less in the longitudinal direction of the conductor, is detectable in the step of inspecting the formation state of the insulating coating.

In the method for inspecting an insulated electric wire of the present application, a defective portion is detected by utilizing the fact that an electrostatic capacity between an insulated electric wire and an electrode disposed outside in a radial direction of the insulated electric wire so as to face an outer peripheral surface of the insulated electric wire varies depending on the formation state of the insulating coating. The inspection method utilizes the fact that the electrostatic capacity between the insulated electric wire and the electrode varies with a change in the thickness and the dielectric constant of the insulating coating. When a defective portion is present in the insulating coating, the thickness and the dielectric constant of the insulated electric wire substantially change, and consequently, the value of the electrostatic capacity between the electrode and the insulating coating changes compared with that in a steady state. Accordingly, when a defective portion is present in the insulating coating, the presence thereof can be detected on the basis of a change in the electrostatic capacity between the electrode and the insulated electric wire transported in the longitudinal direction of the conductor.

Specifically, with respect to an insulated electric wire that includes a linear conductor and an insulating coating provided on the outer peripheral side of the conductor, an electrode is disposed outside in the radial direction of the insulated electric wire so as to face the outer peripheral surface of the insulated electric wire, and the electrostatic capacity (capacitance) between the insulated electric wire and the electrode is measured while transporting the insulated electric wire in the longitudinal direction thereof. In this case, the electrostatic capacity exhibits a steady state in a defect-free normal portion. In contrast, the electrostatic capacity changes when a defective portion such as a scratch, a hole, or a thin-wall portion (a portion having a thickness locally and significantly smaller than an average thickness of the insulating coating) is present in the insulating coating, or a low-porosity portion (a region where no pores are locally present or a region having a porosity that is locally and significantly lower than an average porosity of the insulating coating) is present in the insulating coating having pores therein. For example, when a thin-wall portion in which an insulating coating has a relatively small thickness due to bulging of the conductor is present, the electrostatic capacity between the insulated electric wire and the electrode increases. When a scratch or a hole is present on the insulating coating, the electrostatic capacity changes depending on the state of the scratch and the hole. By detecting the electrostatic capacity between the electrode and the insulated electric wire while transporting the insulated electric wire in the longitudinal direction of the conductor, and by inspecting the formation state of the insulating coating on the basis of a change in the obtained electrostatic capacity, a defective portion in the insulating coating, the defective portion having a length of 4 mm or less in the longitudinal direction of the conductor, can be detected with high accuracy.

A length of the electrode in the longitudinal direction may be adjusted such that the defective portion in the insulating coating, the defective portion having a length of 4 mm or less in the longitudinal direction of the conductor, is detectable. When the electrode having this configuration is provided, a defective portion in the insulating coating, the defective portion having a small length in the longitudinal direction of the conductor, can be detected in the step of inspecting the formation state of the insulating coating. Specifically, the length of the electrode in the longitudinal direction of the conductor is preferably 10 mm or less.

In the step of inspecting the formation state of the insulating coating, the defective portion in the insulating coating, the defective portion having a length of 2 mm or less in the longitudinal direction of the conductor, is preferably detectable. With this configuration, a finer defective portion can be detected with higher accuracy.

The insulating coating of the insulated electric wire prepared in the step of preparing the insulated electric wire may have a pore in the insulating coating. In this case, in the step of inspecting the formation state of the insulating coating, the formation state of the insulating coating may be inspected further on the basis of a relationship between the electrostatic capacity and a porosity.

As described above, it has been found that there is a correlation between the porosity of the insulating coating and the electrostatic capacity (capacitance) between the electrode and the insulated electric wire. Therefore, in the method for inspecting an insulated electric wire of the present application, when pores exist in the insulating coating, a portion where the porosity is changed can be detected as a defective portion. Furthermore, the porosity of a portion where the porosity is changed can be derived by inspecting the formation state of the insulating coating on the basis of the relationship between the electrostatic capacity and the porosity in addition to the change in the electrostatic capacity.

The defective portion in the insulating coating may be a low-porosity portion that is present in the insulating coating having a pore therein. The method for inspecting an insulated electric wire of the present application is also suitable as a method for appropriately detecting a low-porosity portion that can be present in an insulating coating having a pore therein and that is unlikely to be detected by visual observation. The dielectric constant of the insulating coating changes in a portion where a low-porosity portion is present. Therefore, the electrostatic capacity between the insulated electric wire and the electrode varies in the portion where the low-porosity portion is present. The use of this phenomenon enables the low-porosity portion to be more efficiently detected in the method for inspecting an insulated electric wire.

The defective portion in the insulating coating may be a thin-wall portion. The method for inspecting an insulated electric wire of the present application is suitable as a method for appropriately detecting a thin-wall portion that is unlikely to be detected by visual observation. As described above, the term "thin-wall portion" refers to a portion having a thickness locally and significantly smaller than an average thickness of the insulating coating. Since the electrostatic capacity is inversely proportional to the thickness of the insulated electric wire, the presence of a thin-wall portion increases the electrostatic capacity between the insulated electric wire and the electrode. The use of this phenomenon enables the thin-wall portion to be efficiently detected in the method for inspecting an insulated electric wire.

The thin-wall portion may have an amount of decrease in a film thickness of 1 µm or more and 50 µm or less. Since such a thin-wall portion can be appropriately detected as a defective portion, the method can more effectively contribute to the production of an insulated electric wire having less defects.

In the method for inspecting an insulated electric wire, a product of a maximum length of the defective portion in a longitudinal direction and a maximum length of the defective portion in a width direction may be 0.1 mm$^2$ or more and 20 mm$^2$ or less in a planar shape when viewed in plan from a thickness direction of the insulating coating. Since a defective portion having such a size can be appropriately detected, the method can more effectively contribute to the production of an insulated electric wire having less defects.

The insulating coating may contain polyimide. An insulating coating containing polyimide has good insulating properties and heat resistance. Therefore, polyimide is suitable as a material constituting the insulating coating. In addition, since polyimide has a dielectric constant suitable for detecting a defect in the method for inspecting an insulated electric wire, the method for inspecting an insulated electric wire is suitable for detecting a defective portion of an insulated electric wire that includes an insulating coating containing polyimide. The insulating coating may contain polyamide-imide. Since the insulating coating containing polyamide-imide has good insulating properties and durability as in the insulating coating containing polyimide, the insulating coating containing polyamide-imide has advantages similar to those in polyimide.

The step of inspecting the formation state of the insulating coating is preferably performed online. When the step of inspecting the formation state of the insulating coating is performed by online inspection, the production of an insulated electric wire can be continuously performed, and the insulated electric wire can be obtained with high production efficiency. The state in which the inspection is performed online means a state in which, in the series of production steps, the formation state of the insulating coating is continuously inspected subsequent to the step of obtaining the insulated electric wire.

An apparatus for producing an insulated electric wire of the present application includes a conducting wire preparation part configured to prepare a conductor having a linear shape; an insulating coating formation part configured to form an insulating coating so as to cover an outer peripheral side of the conductor; and an inspection part configured to inspect a formation state of the insulating coating of an insulated electric wire that includes the conductor and the insulating coating. The insulating coating formation part includes a coating device configured to apply a varnish (coating liquid) serving as a raw material of the insulating coating so as to cover an outer peripheral side of the conductor, and a heating part configured to heat a coating film applied by the coating device. The inspection part includes a capacitance sensor that includes a first electrode disposed outside in a radial direction of the insulated electric wire so as to face an outer peripheral surface of the insulated electric wire inspected while being transported in a longitudinal direction of the conductor and that is configured to measure a first electrostatic capacity between the first electrode and the insulated electric wire transported in the longitudinal direction of the conductor.

When an insulated electric wire is produced by using this apparatus for producing an insulated electric wire, the formation state of an insulating coating is inspected on the basis of a change in the electrostatic capacity between an electrode and an insulated electric wire transported in the longitudinal direction of a conductor, and when a defective portion is present in the insulating coating, the presence thereof can be detected. Consequently, the insulated electric wire can be produced in a state where even if a defective portion is generated, the defective portion can be detected at high frequency.

In the apparatus for producing an insulated electric wire, a length of the first electrode in the longitudinal direction of the conductor may be 0.1 mm or more and 10 mm or less. The value of the first electrostatic capacity measured by the capacitance sensor of the production apparatus is a value averaged in the longitudinal direction of the electrode. When an electrode that is long in the longitudinal direction of the conductor is used, the detection can be performed in a wide range. However, since the value of the electrostatic capacity is averaged over the longitudinal direction of the electrode, it is difficult to detect a fine defect with high sensitivity. In contrast, when the length of the electrode in the longitudinal direction of the conductor is 10 mm or less, a fine defect that is unlikely to be detected by an electrode that is long in the longitudinal direction can also be detected. On the other hand, when the length of the electrode in the longitudinal direction of the conductor is excessively short, the measurement range becomes narrow, and a variation in the electrostatic capacity increases depending on the difference in local state of the insulating coating. Accordingly, it becomes difficult to correctly detect a defective portion. When the length of the first electrode in the longitudinal direction of the conductor is 0.1 mm or more, a defect can be detected with higher accuracy.

In the apparatus for producing an insulated electric wire, the first electrode may include a plurality of units which are divided so as to be separated from each other in a circumferential direction of the conductor in a section perpendicular to the longitudinal direction of the conductor, and each of the units may extend in the longitudinal direction of the conductor. When the first electrode has such a shape, a position at which a defect is present can also be finely specified in the circumferential direction of the insulated electric wire.

In the apparatus for producing an insulated electric wire, the capacitance sensor may further include a second electrode different from the first electrode, the second electrode being disposed outside in the radial direction of the insulated electric wire so as to face the outer peripheral surface of the insulated electric wire inspected while being transported in the longitudinal direction of the conductor. In this case, the capacitance sensor may be configured to further measure a second electrostatic capacity between the second electrode and the insulated electric wire transported in the longitudinal direction of the conductor. By performing the inspection using a plurality of electrodes including the first electrode and the second electrode in this manner, false detection of a defect is reduced, and a defect can be detected with higher accuracy.

In the apparatus for producing an insulated electric wire, a length of the second electrode in the longitudinal direction of the conductor may be 0.1 mm or more and 10 mm or less. When the length of the electrode in the longitudinal direction of the conductor is 10 mm or less, a fine defect that is unlikely to be detected by an electrode that is long in the longitudinal direction can also be detected. When the length of the second electrode in the longitudinal direction of the conductor is 0.1 mm or more, a defect can be detected with higher accuracy.

When the apparatus for producing an insulated electric wire includes a second electrode, a length of the second electrode in the longitudinal direction of the conductor may be different from that of the first electrode. In this case, a defect can be detected with higher accuracy by determining the first electrostatic capacity between the first electrode and the insulated electric wire and the second electrostatic capacity between the second electrode and the insulated electric wire and by comparing inspection results based on the electrostatic capacities (by determining the difference between the two electrostatic capacities).

In the apparatus for producing an insulated electric wire, the second electrode may include a plurality of units which are divided so as to be separated from each other in a circumferential direction of the conductor in a section perpendicular to the longitudinal direction of the conductor, and each of the units may extend in the longitudinal direction of the conductor. When the second electrode has such a shape, a position at which a defect is present can also be finely specified in the circumferential direction of the insulated electric wire.

In the apparatus for producing an insulated electric wire, the conducting wire preparation part may include an element wire supply part configured to hold and supply a metal element wire, and a conductor-processing part configured to process the metal element wire. When the conducting wire preparation part separately includes the element wire supply part and the conductor-processing part, a conducting wire having a desired shape can be obtained from an element wire by processing the element wire.

In the insulating coating formation part, the coating device may be configured to apply the varnish (coating liquid) containing a polyimide precursor to the conductor, and the heating part may be a baking furnace configured to heat the applied coating film to form a polyimide coating from the polyimide precursor. An insulating coating containing polyimide has good insulating properties and heat resistance. Therefore, polyimide is suitable as a material Constituting the insulating coating. In addition, polyimide has a dielectric constant suitable for detecting a defect in the method for inspecting an insulated electric wire. The insulating coating formation part having this configuration enables an insulating coating containing polyimide to be efficiently produced.

The apparatus for producing an insulated electric wire may further include a coiling part configured to coil the insulated electric wire that has been inspected in the inspection part. The conducting wire preparation part to the coiling part may be arranged side by side so that the insulated electric wire is not cut. When components included in the apparatus for producing an insulated electric wire are arranged side by side, an insulated electric wire can be continuously produced without interruption during the production of the insulated electric wire. As a result, the insulated electric wire can be obtained with high production efficiency. In addition, the step of inspecting the formation state of the insulating coating can be performed by online inspection.

Detailed Description of Embodiments of Present Invention

Next, a method for producing an insulated electric wire, a method for inspecting an insulated electric wire, and an apparatus for producing an insulated electric wire according to embodiments of the present application will be described with reference to the drawings. In the following drawings, the same or corresponding parts are denoted by the same reference numerals, and a description thereof is not repeated.

Embodiment 1

[Structure of Insulated Electric Wire]

First, Embodiment 1 will be described with reference to FIGS. 1 to 13. FIG. 1 is a schematic sectional view illustrating an example of an insulated electric wire inspected in Embodiment 1. Referring to FIG. 1, an insulated electric wire 1 has a circular sectional shape in a section perpendicular to the longitudinal direction of a conductor 10 having a linear shape. The insulated electric wire 1 includes the linear conductor 10 having a circular sectional shape and an insulating coating 20 formed on the outer peripheral side of the conductor 10. The insulating coating 20 is formed of an insulator containing an organic material. The insulating coating 20 includes pores 15 therein. Specifically, the insulating coating 20 is formed in a state where a plurality (a large number) of pores 15 are dispersed therein.

Examples of the organic material contained in the insulator include, but are not particularly limited to, thermosetting resins such as polyimide (PI) and polyamide-imide (PAI) and thermoplastic resins such as polyethersulfone (PES) and polyetheretherketone (PEEK). In particular, the insulator constituting the insulating coating 20 is preferably one containing polyimide or polyamide-imide and more preferably one containing polyimide in view of good insulating properties and heat resistance. More preferably, 50% by mass or more of the insulator constituting the insulating coating 20 is made of polyimide. Particularly preferably, the insulator is made of polyimide and unavoidable impurities. For example, part of the insulating coating 20 in this embodiment, the part being other than the pores 15, is a polyimide coating made of polyimide and unavoidable impurities. Referring to FIG. 1, the insulating coating 20 in this embodiment includes pores 15 therein. A ratio of the total volume of the pores 15 relative to the entire volume of the insulating coating 20 (porosity) is, for example, 5% by volume or more and 80% by volume or less, preferably 10% by volume or more and 70% by volume or less, and more preferably 25% by volume or more and 65% by volume or less. Since air and the material constituting the insulating coating 20 such as polyimide have different dielectric constants, the dielectric constant of the whole insulating coating 20 changes when the insulating coating 20 has the pores 15. For example, polyimide has a dielectric constant (relative dielectric constant) higher than air. Accordingly, when the insulating coating 20 is made of polyimide, an insulating coating 20 having a dielectric constant lower than an insulating coating 20 that has no pores 15 can be obtained by providing the insulating coating 20 with pores 15.

The insulated electric wire 1 may have pores 15 in a state where the pores 15 are dispersed in the insulating coating 20, as illustrated in FIG. 1. Alternatively, the insulating coating 20 may have a multilayer structure including a solid layer and a porous layer having pores 15, although the structure is not illustrated. In this case, the thickness of the solid layer and the thickness of the porous layer can be appropriately determined depending on required properties.

Figure 2:
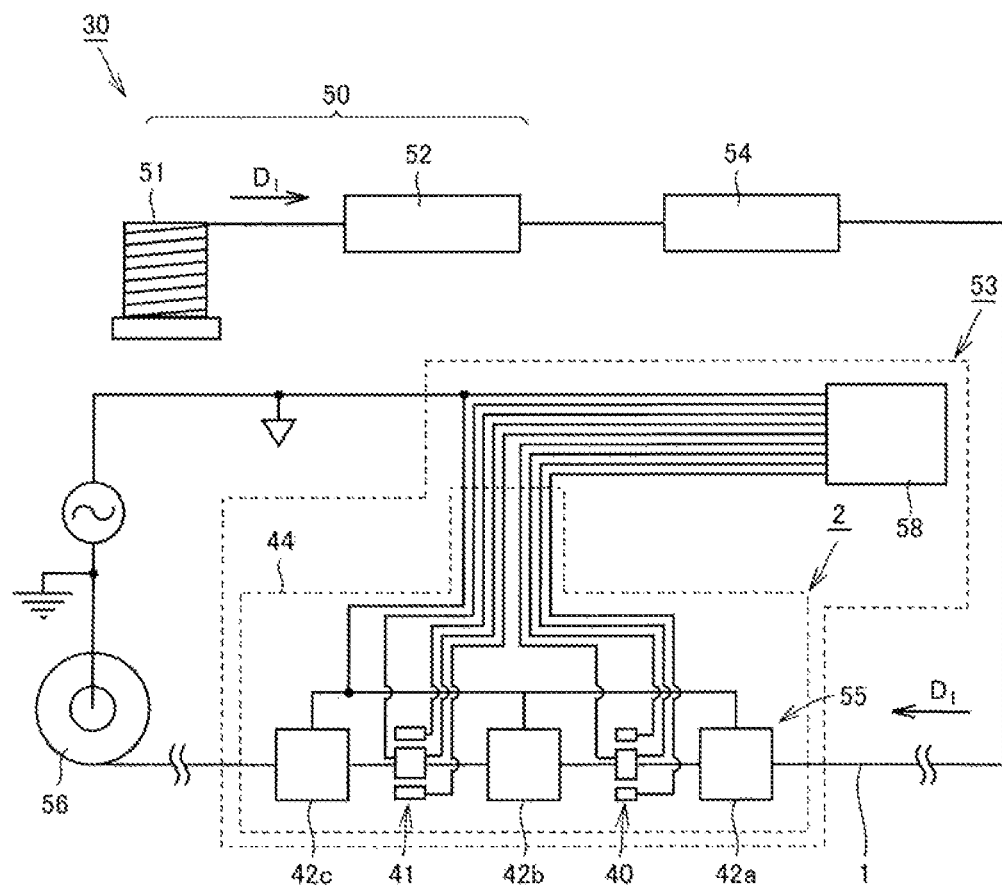
FIG. 2 is a block diagram for explaining steps of producing an insulated electric wire, in which a production method and an inspection method of the insulated electric wire are performed.
Figure 3:
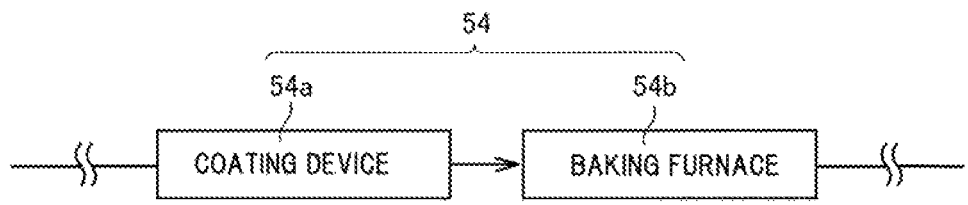
FIG. 3 is a block diagram for explaining an insulating coating formation part.
Figure 4:
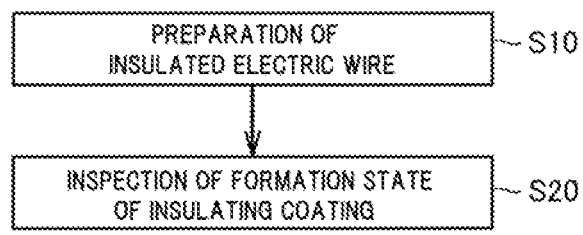
FIG. 4 is a flowchart illustrating a procedure of a method for inspecting an insulated electric wire.
Figure 5:
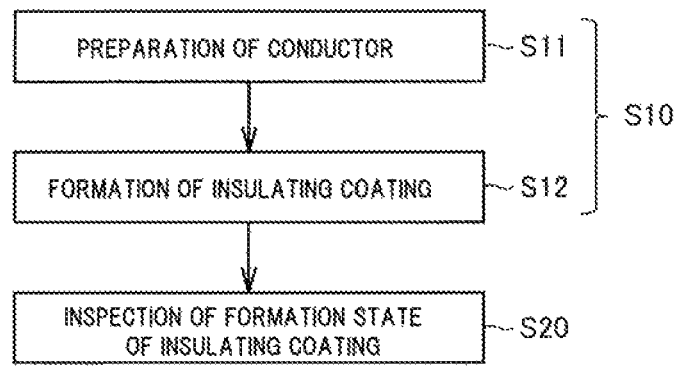
FIG. 5 is a flowchart illustrating a procedure of a method for producing an insulated electric wire.
Figure 6:
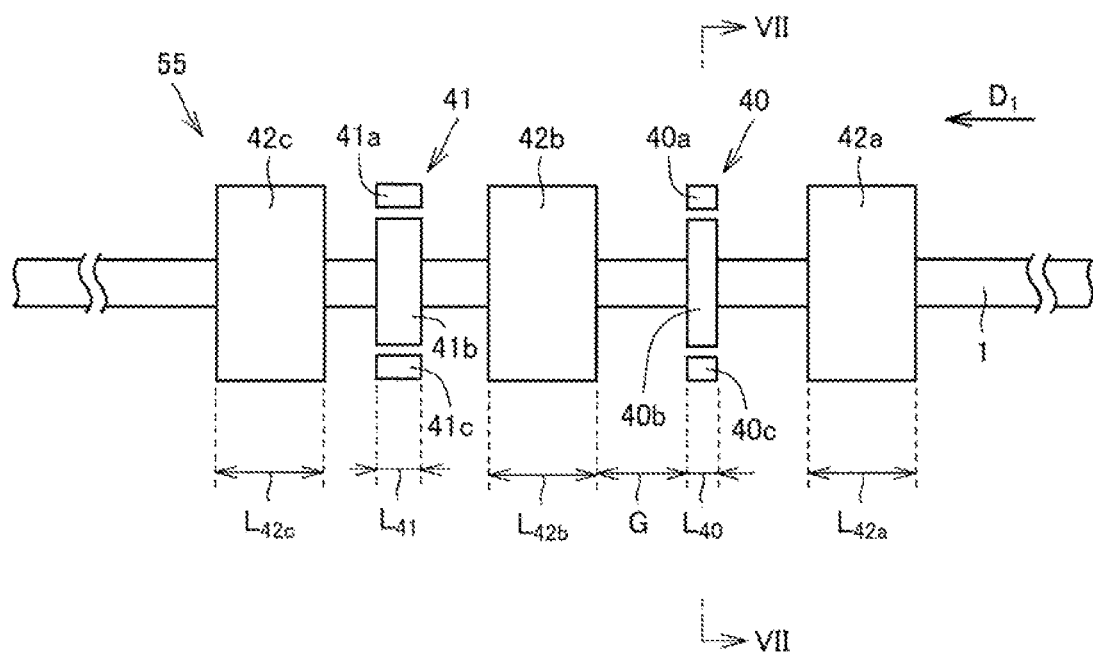
FIG. 6 is a schematic plan view illustrating an example of the structure of an inspection electrode in Embodiment 1.
Figure 7:
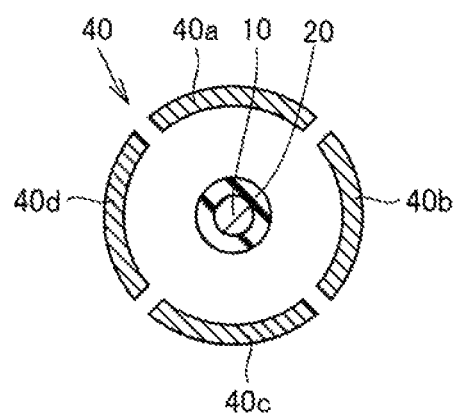
FIG. 7 is a schematic sectional view corresponding to the state of a section taken along line segment VII-VII in FIG. 6, as viewed in the direction of the arrows.

Next, flows of a production method and an inspection method of an insulated electric wire 1 according to this embodiment will be described with reference to FIGS. 2 to 7. FIG. 2 is a block diagram for explaining steps of producing an insulated electric wire 1, in which a production method and an inspection method of the insulated electric wire 1 are performed. FIG. 3 is a block diagram for explaining an insulating coating formation part 54. FIG. 4 is a flowchart illustrating a procedure of a method for inspecting an insulated electric wire 1. FIG. 5 is a flowchart illustrating a procedure of a method for producing an insulated electric wire 1. FIG. 6 is a schematic plan view illustrating an example of the structure of an inspection electrode in Embodiment 1. FIG. 7 is a schematic sectional view corresponding to the state of a section taken along line segment VII-VII in FIG. 6, as viewed in the direction of the arrows.

[Configurations of Inspection Apparatus and Production Apparatus of Insulated Electric Wire]

Referring to FIGS. 2 and 3, a production apparatus 30 of an insulated electric wire 1 includes a conducting wire preparation part 50, an insulating coating formation part 54, an inspection part 53, and a coiling part 56. The conducting wire preparation part 50 to the coiling part 56 are arranged side by side. An inspection of the insulated electric wire 1 is performed in the inspection part 53. The conducting wire preparation part 50 includes an element wire supply part 51 and a conductor-processing part 52. The element wire supply part 51 is configured to hold a metal element wire, such as a copper element wire, serving as a raw material of a conductor 10 and to supply the metal element wire to the conductor-processing part 52. The conductor-processing part 52 is disposed on the downstream side of the element wire supply part 51 and configured to process the metal element wire supplied from the element wire supply part 51 so that the metal element wire has a desired shape am/a desired size. The conductor-processing part 52 includes a metal mold for metal working such as a die used in, for example, a drawing process (wire drawing).

The insulating coating formation part 54 is disposed on the downstream side of the conductor-processing part 52. The insulating coating formation part 54 includes, for example, a coating device 52a configured to apply a varnish (coating liquid) serving as a raw material of an insulating coating 20 to the conductor 10 and a baking furnace 54b serving as a heating part and configured to heat a coating film formed by the coating device 54a to form a polyimide coating.

The inspection part 53 is disposed on the downstream side of the insulating coating formation part 54. In the inspection part 53, a first electrostatic capacity between the insulated electric wire 1 and a first main electrode 40 serving as a first electrode is measured in a state in which the insulated electric wire 1 is transported in the longitudinal direction of the conductor 10. The formation state of the insulating coating 20 is inspected on the basis of a change in the first electrostatic capacity and a relationship between the first electrostatic capacity and the porosity of the insulating coating 20. Furthermore, a second electrostatic capacity between the insulated electric wire 1 and a second main electrode 41 serving as a second electrode may be measured while transporting the insulated electric wire 1 in the longitudinal direction of the conductor 10, and the formation state of the insulating coating 20 may be inspected on the basis of a change in at least one of the first electrostatic capacity and the second electrostatic capacity, and a relationship between the porosity of the insulating coating 20 and the first electrostatic capacity and the second electrostatic capacity. The inspection part 53 includes a capacitance sensor 2 and a capacitance monitor 58. The capacitance sensor 2 includes an inspection electrode 55, a housing 44, and wiring lines connected to electrodes in the inspection electrode 55. When the insulated electric wire 1 is transported in the longitudinal direction of the conductor 10, the insulated electric wire 1 passes through the inside of the capacitance sensor 2 to measure the first electrostatic capacity and the second electrostatic capacity between the first main electrode 40 or the second main electrode 41 and the insulated electric wire 1.

The structure of the capacitance sensor 2 will be described with reference to FIGS. 2, 6, and 7. The capacitance sensor 2 includes an inspection electrode 55 and a housing 44. The inspection electrode 55 of the capacitance sensor 2 according to Embodiment 1 includes the first main electrode 40 serving as the first electrode, the second main electrode 41 serving as the second electrode, a first guard electrode 42a, a second guard electrode 42b, and a third guard electrode 42c. The housing 44 has a shape capable of housing the first main electrode 40, the second main electrode 41, the first guard electrode 42a, the second guard electrode 42b, the third guard electrode 42c, and the wiring lines connected to the electrodes.

The structure of the inspection electrode 55 will be further described with reference to FIG. 7. The first main electrode 40 is constituted by four electrode units 40a, 40b, 40c, and 40d which have shapes of circular arcs divided into four portions so as to be separated from each other in the circumferential direction of the conductor 10 in a section perpendicular to the longitudinal direction of the conductor 10 and each of which extends in the longitudinal direction of the conductor 10. The second main electrode 41 is also constituted by four electrode units 41a, 41b, 41c, and 41d each of which has a similar sectional shape and extends in the longitudinal direction of the conductor 10 (as in the electrode unit 40d, the electrode unit 41d is located on the opposite side of the electrode unit 41b with the insulated electric wire 1 therebetween and is not illustrated). Each of the electrode units of the first main electrode 40 and the second main electrode 41 is connected to the capacitance monitor 58 with a wiring line therebetween as illustrated in FIG. 2. For the sake of convenience of explanation, illustration of the wiring lines connected to the electrodes is omitted in FIG. 6 and thereafter.

A length $L_{40}$ of the first main electrode 40 in the longitudinal direction of the conductor 10 is different from a length $L_{41}$ of the second main electrode 41 in the same direction. In FIG. 6, the length $L_{41}$ of the second main electrode 41 is larger than the length $L_{40}$ of the first main electrode 40. The length $L_{40}$ of the first main electrode 40 and the length $L_{41}$ of the second main electrode 41 in this embodiment are each determined to be 0.1 mm or more and preferably 10 mm or less, and more preferably 5 mm or less but are not particularly limited. When the length $L_{40}$ and the length $L_{41}$ are within this range, it is possible to efficiently detect a defective portion, in particular, a low-porosity portion or a thin-wall portion in an insulating coating, the portion having a length of 4 mm or less, preferably 2 mm or less, and more preferably 1 mm or less in the longitudinal direction of the conductor 10.

The first guard electrode 42a is disposed on the upstream side in the longitudinal direction of the conductor 10 as viewed from the first main electrode 40. The second guard electrode 42b is disposed between the first main electrode 40 and the second main electrode 41 in the longitudinal direction of the conductor 10. The third guard electrode 42c is disposed on the downstream side in the longitudinal direction of the conductor 10 as viewed from the second main electrode 41. The first guard electrode 42a, the second guard electrode 42b, and the third guard electrode 42c are provided in order to reduce concentration of an electric field at end portions of the first main electrode 40 and the second main electrode 41 and to stably measure numerical values of the first electrostatic capacity generated between the insulated electric wire 1 and the first main electrode 40 and the second electrostatic capacity generated between the insulated electric wire 1 and the second main electrode 41. The first guard electrode 42a, the second guard electrode 42b, and the third guard electrode 42c are connected to each other with wiring lines therebetween. The first guard electrode 42a, the second guard electrode 42b, and the third guard electrode 42c are connected to the capacitance monitor 58 and the coiling part 56 and grounded in a path between the coiling part 56 and the first guard electrode 42a, the second guard electrode 42b, and the third guard electrode 42c. That is, the first guard electrode 42a, the second guard electrode 42b, and the third guard electrode 42c are ground electrodes.

The first guard electrode 42a, the second guard electrode 42b, and the third guard electrode 42c in this embodiment have the same structure. Specifically, the first guard electrode 42a, the second guard electrode 42b, and the third guard electrode 42c each have a hollow cylindrical shape, and lengths $L_{42a}$, $L_{42b}$, and $L_{42c}$ of the guard electrodes in the longitudinal direction of the conductor 10 are equal to each other. Each of the main electrodes 40 and 41 and each of the guard electrodes 42a, 42b, and 42c are disposed with a gap G therebetween. A gap between the insulated electric wire 1 and each of the main electrodes 40 and 41 is appropriately determined within a range in which the first electrostatic capacity and the second electrostatic capacity to be measured become stable.

The capacitance monitor 58 is connected to the electrode units included in the inspection electrode 55 of the capacitance sensor 2. The capacitance monitor 58 is grounded together with the first guard electrode 42a, the second guard electrode 42b, and the third guard electrode 42c with the wiring lines therebetween. The capacitance monitor 58 displays electrostatic capacities measured in the capacitance sensor 2 and records the electrostatic capacities in association with a recording time or a position of the insulated electric wire 1 inspected. A normal portion and a defective portion in the insulated electric wire 1 can be distinguished from each other on the basis of variations in the electrostatic capacities displayed or recorded in the capacitance monitor 58.

The coiling part 56 is disposed on the downstream side of the inspection part 53. The coiling part 56 includes a take-up reel-mounting part on which a detachable take-up reel can be disposed and is configured to coil the insulated electric wire 1 that has been inspected in the inspection part 53. The take-up reel on which the insulated electric wire 1 has been coiled is detached from the take-up reel-mounting part. Thus, the insulated electric wire 1 can be obtained in a coiled state.

[Procedures of Inspection Method and Production Method of Insulated Electric Wire 1]

Figure 8:
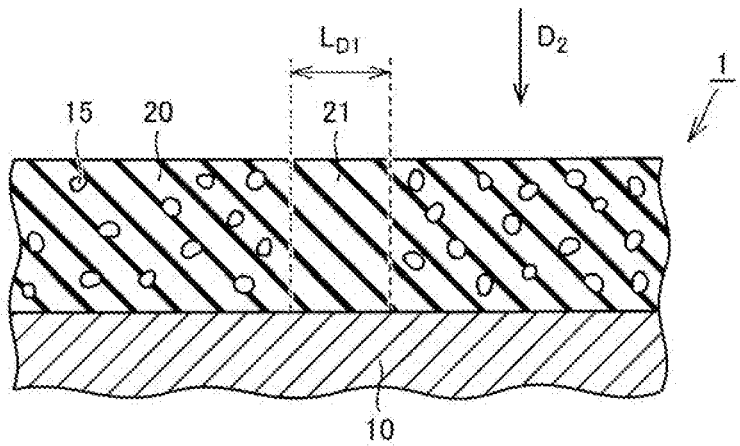
FIG. 8 is a schematic sectional view illustrating the state of a low-porosity portion in an insulating coating.
Figure 9:
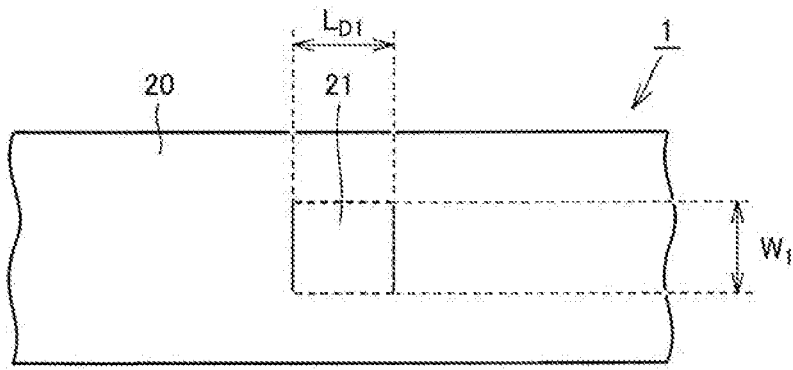
FIG. 9 is a schematic view illustrating the state of the low-porosity portion, as viewed in the direction of arrow $D_2$ in FIG. 8.
Figure 10:
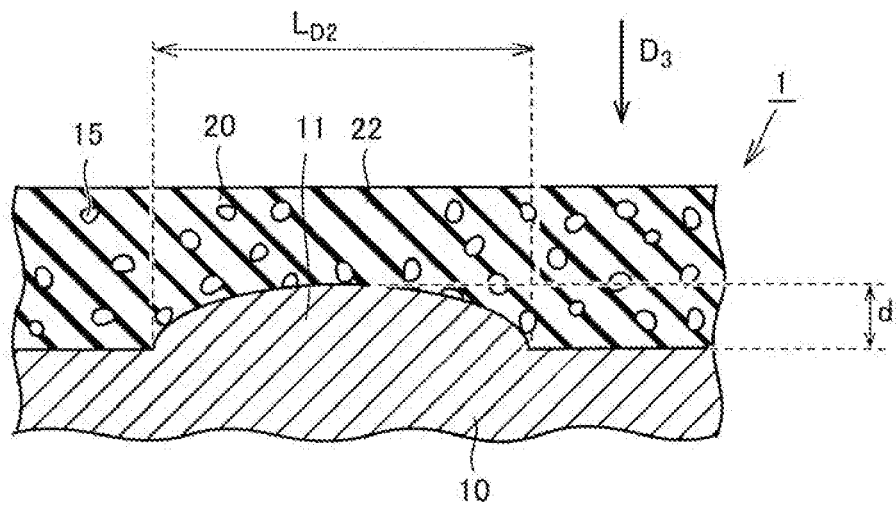
FIG. 10 is a schematic sectional view illustrating the state of a thin-wall portion of an insulating coating.
Figure 11:
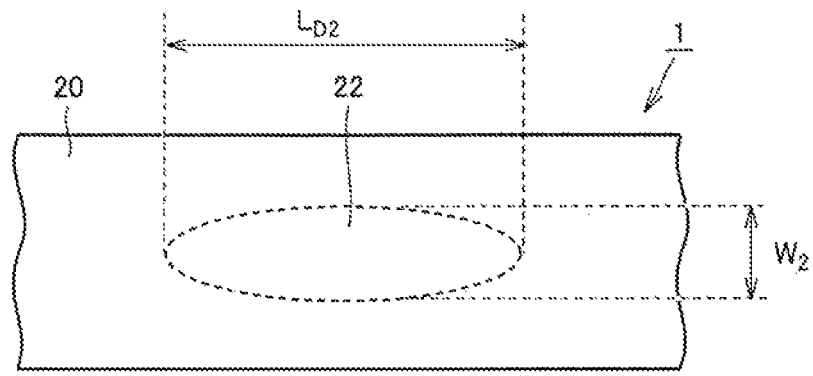
FIG. 11 is a schematic view illustrating the state of the thin-wall portion, as viewed in the direction of arrow $D_3$ in FIG. 10.
Figure 12:
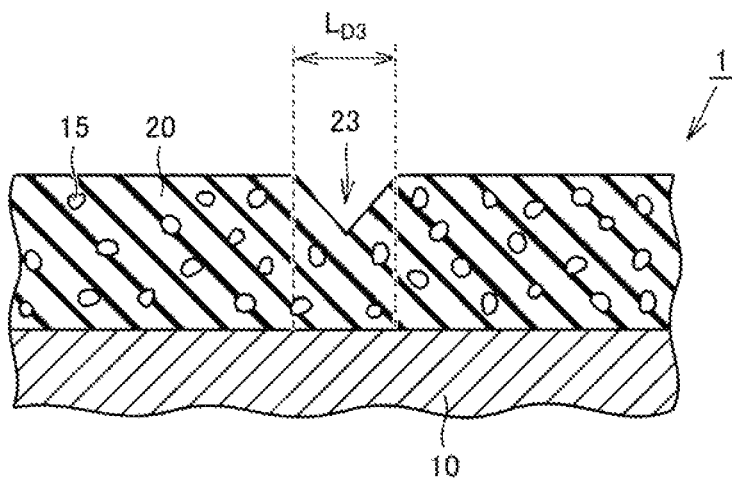
FIG. 12 is a schematic sectional view illustrating the state of a scratch defect on a surface of an insulating coating.
Figure 13:
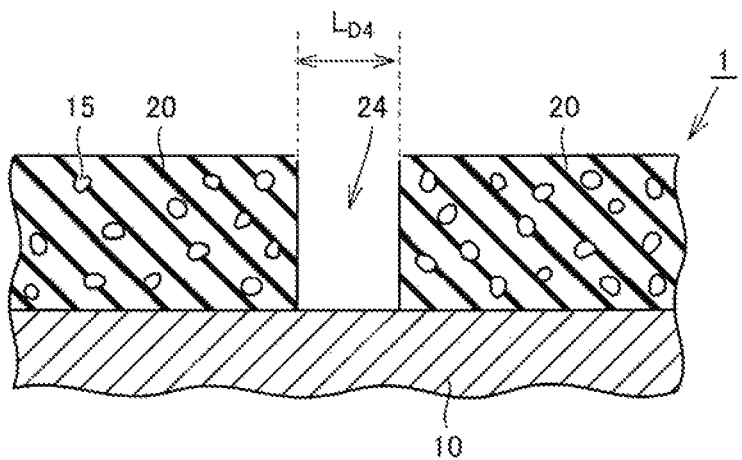
FIG. 13 is a schematic sectional view illustrating the state of a hole defect of an insulating coating.

Next, procedures of an inspection method and a production method of an insulated electric wire 1 will be described with reference to FIGS. 1 to 13. FIG. 8 is a schematic sectional view illustrating the state of a low-porosity portion in an insulating coating 20. FIG. 9 is a schematic view illustrating the state of the low-porosity portion, as viewed in the direction of arrow $D_2$ in FIG. 8. FIG. 10 is a schematic sectional view illustrating the state of a thin-wall portion of an insulating coating 20. FIG. 11 is a schematic view illustrating the state of the thin-wall portion, as viewed in the direction of arrow $D_3$ in FIG. 10. FIG. 12 is a schematic sectional view illustrating the state of a scratch defect on a surface of an insulating coating 20. FIG. 13 is a schematic sectional view illustrating the state of a hole defect of an insulating coating 20.

Steps S10 to S20 shown in FIG. 4 are performed in the method for inspecting an insulated electric wire 1 according to this embodiment. A step of preparing a conductor 10 (step S11) and a step of forming an insulating coating 20 (step S12) are performed in step S10 in the method for producing an insulated electric wire 1 according to this embodiment. Thus, the method for producing an insulated electric wire 1 according to this embodiment includes the method for inspecting an insulated electric wire 1 according to this embodiment.

Referring to FIGS. 2 to 4, an insulated electric wire 1 to be inspected is prepared (S10). The preparation of the insulated electric wire 1 is performed, for example, as follows. First, a linear conductor 10 having a circular sectional shape is prepared in a conducting wire preparation part 50 (S11). Specifically, a metal element wire, such as a copper element wire, held by an element wire supply part 51 is pulled out. The element wire is fed in the direction of arrow $D_1$ and supplied to a conductor-processing part 52. The metal element wire supplied from the element wire supply part 51 is processed into a conductor 10 having a desired shape and a desired size by being subjected to a drawing process (wire drawing) with a die. The conductor 10 processed from the element wire in the conductor-processing part 52 is fed to an insulating coating formation part 54.

Next, an insulating coating 20 is formed on the outer peripheral side of the conductor 10 (S12). The insulating coating 20 is formed so as to cover a surface on the outer peripheral side of the conductor 10 having a linear shape, as illustrated in FIG. 1. The insulating coating 20 is formed of an insulator and includes pores 15 therein.

Referring to FIG. 3, the insulating coating formation part 54 includes a coating device 54a of a varnish (coating liquid) and a baking furnace 54b serving as a heating part. In the insulating coating formation part 54, the insulating coating 20 is formed so as to cover the surface on the outer peripheral side of the conductor 10 by the procedure described below.

First, the conductor 10 processed in the conductor-processing part 52 passes in the varnish kept in the coating device 54a to thereby apply the varnish so as to cover the surface on the outer peripheral side of the conductor 10. The varnish applied in this embodiment contains a precursor of polyimide in an organic solvent. Next, the applied coating film is heated in the baking furnace 54b serving as the heating part to accelerate a reaction from the polyimide precursor to polyimide. Since polyimide is thermosetting, the coating film is cured by heating. Thus, the insulating coating 20 made of polyimide, which is an insulator, is formed so as to cover the surface on the outer peripheral side of the conductor 10.

An insulating coating 20 having a desired thickness can be formed by repeating the cycle of application of the varnish and heating as required. The insulated electric wire 1 is prepared in this manner.

Next, the insulated electric wire 1 prepared above is inspected (S20). The formation state of the insulating coating 20 is inspected in an inspection part 53 while the insulated electric wire 1 including the insulating coating 20 formed in the insulating coating formation part 54 is further transported in the direction of arrow $D_1$, which is the longitudinal direction of the conductor 10.

The inspection is performed by using a capacitance sensor 2 and a capacitance monitor 58 as illustrated in FIG. 2 in a state in which the capacitance sensor 2 is immersed in water. Data of an electrostatic capacity measured by an inspection electrode 55 of the capacitance sensor 2 is transmitted to the capacitance monitor 58. The formation state of the insulating coating 20 is inspected on the basis of a change in the electrostatic capacity displayed on the capacitance monitor 58.

The inspection part 53 is configured to measure a first electrostatic capacity between a first main electrode 40 serving as a first electrode and the insulated electric wire 1 and to inspect the formation state of the insulating coating 20 on the basis of a change in the first electrostatic capacity. Furthermore, the inspection part 53 may be configured to measure a second electrostatic capacity between a second main electrode 41 serving as a second electrode and the insulated electric wire 1 and to inspect the formation state of the insulating coating 20 on the basis of both a change in the first electrostatic capacity or and a change in the second electrostatic capacity. In this embodiment, the second electrostatic capacity between the second main electrode 41 and the insulated electric wire 1 is measured, and the formation state of the insulating coating 20 is inspected on the basis of both the change in the first electrostatic capacity and the change in the second electrostatic capacity. The measurement of the first electrostatic capacity and the second electrostatic capacity and the inspection based on the changes in the two electrostatic capacities enable defective portions to be detected with higher accuracy.

The inspection is specifically performed as follows. First, a voltage is applied to electrode units 40a, 40b, 40c, and 40d of the first main electrode 40 and electrode units 41a, 41b, 41c, and 41d of the second main electrode 41 to measure the first electrostatic capacity between the first main electrode 40 and the insulated electric wire 1 and the second electrostatic capacity between the second main electrode 41 and the insulated electric wire 1.

Next, the formation state of the insulating coating 20 is inspected on the basis of at least one of the change in the first electrostatic capacity measured and the change in the second electrostatic capacity measured. For example, in a normal state in which no defective portion is present in the insulating coating 20, the electrostatic capacities measured show steady values. On the other hand, when a defective portion is present in the insulating coating 20, the electrostatic capacities change. The position of the defective portion is specified on the basis of the changes in the electrostatic capacities and recorded. An insulated electric wire 1 having a stable quality can be produced in this manner.

The insulated electric wire 1 in which the formation state of the insulating coating 20 has been inspected in the capacitance sensor 2 is subsequently coiled in a coiling part 56. The coiled insulated electric wire 1 may be produced as a product in a state in which the positions of the defective portions are have been recorded. The insulated electric wire 1 including defective portions may be disposed of without being produced as a product. Alternatively, only a portion including a defective portion may be removed on the basis of the recorded position, and the remaining portion may be produced as a product.

In this embodiment, the inspection described above is performed online. Regarding the inspection performed online, in the series of steps from step S10 to step S20, the formation state of the insulating coating 20 obtained in step S10 is continuously inspected subsequent to step S10. When the inspection is performed online, a series of flow from the element wire supply part 51 to the coiling part 56 illustrated in FIG. 2 is successively performed without cutting the insulated electric wire 1.

In the step of inspecting the formation state of the insulating coating 20, a voltage is applied to electrode units 40a, 40b, 40c, and 40d of the first main electrode 40 and electrode units 41a, 41b, 41c, and 41d of the second main electrode 41 in a state in which the inspection electrode 55 is immersed in water (not shown), and changes in the first electrostatic capacity and the second electrostatic capacity between the first main electrode 40 or the second main electrode 41 and the insulated electric wire 1 are monitored in the capacitance monitor 58. The formation state of the insulating coating 20 is inspected on the basis of at least one of the change in the first electrostatic capacity and the change in the second electrostatic capacity.

In Embodiment 1, the first main electrode 40 is constituted by four electrode units 40a, 40b, 40c, and 40d which are divided into four portions so as to be separated from each other in the circumferential direction of the conductor 10 in a section perpendicular to the longitudinal direction of the conductor 10, each of which has a circular arc-like shape in the section, and each of which extends in the longitudinal direction of the conductor 10. Similarly, the second main electrode 41 is also constituted by four electrode units that are divided into four portions in the circumferential direction. The use of the first main electrode 40 and the second main electrode 41 each constituted by a plurality of electrode units that are divided in the circumferential direction enables a position at which a defective portion is present to be also finely specified in the circumferential direction of the insulated electric wire 1. Note that the number of the plurality of electrode units in the circumferential direction of the main electrode is not particularly limited to four. A main electrode including any number of two or more electrode units in the circumferential direction, for example, a main electrode including electrode units that are divided into two portions in the circumferential direction may be selected according to need.

In the method for inspecting an insulated electric wire 1 according to Embodiment 1, a low-porosity portion 21 in an insulating coating 20 as illustrated in FIGS. 8 and 9 can be detected. The low-porosity portion 21 is a portion having a porosity that is significantly lower than an average porosity of the whole insulating coating 20 and having a low ratio of pores 15 in the insulating coating 20. Among low-porosity portions 21, in particular, a portion in which no pores 15 are present is referred to as a pore-free portion. The low-porosity portion 21, in particular, the pore-free portion can become a cause of the occurrence of partial discharge. In order to produce an insulated electric wire 1 having a stable quality, it is preferable to control the quality of the insulating coating 20 by appropriately detecting the presence of such a low-porosity portion 21.

Referring to FIGS. 8 and 9, the method for inspecting an insulated electric wire 1 according to Embodiment 1 can detect a low-porosity portion 21 having a length $L_{D1}$ of 4 mm or less, preferably 2 mm or less, and more preferably 1 mm or less in the longitudinal direction of the conductor 10. As illustrated in FIGS. 2 and 6, the lengths of the first main electrode 40 and the second main electrode 41 in the longitudinal direction of the conductor 10 are adjusted such that a low-porosity portion 21 in the insulating coating 20, the low-porosity portion 21 having a length of 4 mm or less, preferably 2 mm or less, and more preferably 1 mm or less in the longitudinal direction of the conductor 10, is detectable. For example, the lengths of the first main electrode 40 and the second main electrode 41 in the longitudinal direction of the conductor 10 are each 0.1 mm or more and 10 mm or less. Since such a very small low-porosity portion 21 can be detected, a defective portion that is substantially damaging can be effectively detected.

Furthermore, referring to FIG. 9, in the method for inspecting an insulated electric wire 1 according to Embodiment 1, a low-porosity portion 21 having a product of a maximum length $L_{D1}$ in the longitudinal direction and a maximum length $W_1$ in the width direction of 0.1 mm² or more and 20 mm² or less can be detected as a defective portion. Since the formation state of a low-porosity portion 21 in this range is inspected, and such a low-porosity portion 21 can be detected, a defective portion that is substantially damaging can be detected with higher accuracy.

In the method for inspecting an insulated electric wire 1 according to Embodiment 1, a thin-wall portion 22 in an insulating coating 20 as illustrated in FIG. 10 can also be detected. The thin-wall portion 22 refers to a portion of the insulating coating 20, the portion having a locally thin wall due to expansion 11 of the conductor 10. The presence of such a thin-wall portion 22 decreases insulating properties in the thin-wall portion 22. Therefore, in order to produce an insulated electric wire 1 having a stable quality, it is preferable to control the quality of the insulating coating 20 by appropriately also detecting the presence of such a thin-wall portion 22.

Referring to FIGS. 10 and 11, the method for inspecting an insulated electric wire 1 according to Embodiment 1 can detect a thin-wall portion 22 having a length $L_{D2}$ of 4 mm or less, preferably 2 mm or less, and more preferably 1 mm or less in the longitudinal direction of the conductor 10. As illustrated in FIGS. 2 and 6, the lengths of the first main electrode 40 and the second main electrode 41 in the longitudinal direction of the conductor 10 are adjusted such that a thin-wall portion 22 in the insulating coating 20, the thin-wall portion 22 having a length of 4 mm or less, preferably 2 mm or less, and more preferably 1 mm or less in the longitudinal direction of the conductor 10, is detectable. For example, the lengths of the first main electrode 40 and the second main electrode 41 in the longitudinal direction of the conductor 10 are each 0.1 mm or more and 10 mm or less. Since the formation state of a very small thin-wall portion 22 is inspected, and such a thin-wall portion 22 can be detected, a defective portion that is substantially damaging can be effectively detected.

Furthermore, referring to FIG. 11, in the method for inspecting an insulated electric wire 1 according to Embodiment 1, a thin-wall portion 22 having a product of a maximum length $L_{D2}$ in the longitudinal direction and a maximum length $W_2$ in the width direction of 0.1 mm² or more and 20 mm² or less can be detected as a defective portion. Since a thin-wall portion 22 in this range can be detected, a defective portion that is substantially damaging can be detected with higher accuracy.

Furthermore, referring to FIG. 10, in the method for inspecting an insulated electric wire 1 according to Embodiment 1, a thin-wall portion 22 having an amount d of decrease in the film thickness of 1 μm or more and 50 μm or less can be detected as a defective portion. Since a thin-wall portion 22 having an amount d of decrease in the film thickness in this range can also be detected, a thin-wall portion 22 that may affect a decrease in insulating properties of the insulating coating 20 can be more appropriately detected.

The method for inspecting an insulated electric wire 1 according to Embodiment 1 can also detect a scratch 23 having a length $L_{D3}$ of 4 mm or less, preferably 2 mm or less, and more preferably 1 mm or less in the longitudinal direction of the conductor 10, the scratch 23 being present on a surface of the insulating coating 20, as illustrated in FIG. 12. It is also possible to detect a hole 24 having a length $L_{D4}$ of 4 mm or less, preferably 2 mm or less, and more preferably 1 mm or less in the longitudinal direction of the conductor 10, as illustrated in FIG. 13. Defective portions, such as the scratch 23 and the hole 24, which can be determined from the appearance of the insulating coating 20 can also be detected by a typical defect inspection method including image analysis or the like. However, it is difficult to detect, only from the appearance, the low-porosity portion 21 illustrated in FIG. 8 and the thin-wall portion 22 illustrated in FIG. 10, in particular, very small low-porosity portion 21 and thin-wall portion 22 having a length of 4 mm or less in the longitudinal direction of the conductor 10. If, in addition to the scratch 23 and the hole 24, the low-porosity portion 21 and the thin-wall portion 22 that respectively have a length $L_{D1}$ and a length $L_{D2}$ of 4 mm or less, preferably 2 mm or less, and more preferably 1 mm or less in the longitudinal direction of the conductor 10 can be appropriately detected, defective portions that are substantially damaging can be effectively detected.

In Embodiment 1, not only the formation state of the scratch 23 and the hole 24 but also the formation state of the low-porosity portion 21 and the thin-wall portion 22 described above can be inspected by inspecting the formation state of the insulating coating 20 on the basis of the relationship between the porosity of the insulating coating 20 and the first electrostatic capacity and the second electrostatic capacity using, as main electrodes, the first main electrode 40 and the second main electrode 41 described above. As a result, according to the method for inspecting an insulated electric wire 1 of the present application, various defective portions can be appropriately detected, and an insulated electric wire 1 having a stable quality can be produced.

In Embodiment 1, the first main electrode 40 and the second main electrode 41 that respectively have lengths $L_{40}$ and $L_{41}$ of preferably 10 mm or less and more preferably 5 mm or less in the longitudinal direction of the conductor 10 are used. The value of the electrostatic capacity measured is an average of the whole first main electrode 40 or an average of the whole second main electrode 41. Accordingly, when the electrode is long in the longitudinal direction of the conductor 10, the detection can be performed in a wide range. However, since the value of the electrostatic capacity is averaged over the longitudinal direction, it is difficult to detect a small defective portion with high sensitivity. In contrast, when the length $L_{40}$ of the first main electrode 40 and the length $L_{41}$ of the second main electrode 41 in the longitudinal direction of the conductor 10 are short enough (preferably 10 mm or less), a small defective portion that cannot be detected with an electrode that is long in the longitudinal direction, in particular, a defective portion having a length of 4 mm or less, preferably 2 mm or less, and more preferably 1 mm or less in the longitudinal direction of the conductor 10 can also be appropriately detected.

Furthermore, by making the length $L_{40}$ of the first main electrode 40 and the length $L_{41}$ of the second main electrode 41 in the longitudinal direction of the conductor 10 short enough (preferably 10 mm or less) and inspecting the formation state of the insulating coating 20 on the basis of the relationships between the porosity of the insulating coating 20 and the first electrostatic capacity and the second electrostatic capacity, it is possible to detect not only defective portions due to a scratch 23 and a hole 24 or defective portions having large sizes but also small defective portions, in particular, defective portions due to a low-porosity portion 21 and a thin-wall portion 22 each having a length of 4 mm or less, preferably 2 mm or less, and more preferably 1 mm or less in the longitudinal direction of the conductor 10.

In this embodiment, the first electrostatic capacity and the second electrostatic capacity are measured by using the capacitance sensor 2 including the inspection electrode 55 that has a plurality of main electrodes, namely, the first main electrode 40 and the second main electrode 41. Since the inspection is performed with the plurality of main electrodes in this manner, whether or not inspection results obtained by one of the main electrodes include false detection of a defective portion can be examined by comparing with inspection results obtained by another main electrode. As a result, false detection of defective portions is reduced, and defective portions can be detected with higher accuracy.

Furthermore, the length of the first main electrode 40 and the length of the second main electrode 41 are different from each other. Accordingly, the formation state of the insulating coating 20 in a narrower range can be inspected by determining the first electrostatic capacity and the second electrostatic capacity measured with the two main electrodes and by comparing inspection results based on changes in the electrostatic capacities (by determining the difference between the two electrostatic capacities). Specifically, the formation state of the insulating coating 20 in a range substantially corresponding to the difference ($L_{41}-L_{40}$) (for example, 10 mm or less, and 5 mm as a specific example) can be inspected by determining the first electrostatic capacity between the first main electrode 40 having a length of $L_{40}$ and the insulated electric wire 1 and the second electrostatic capacity between the second main electrode 41 having a length $L_{41}$ longer than the length $L_{40}$ and the insulated electric wire 1, and by comparing inspection results based on the electrostatic capacities (by determining the difference between the two electrostatic capacities).

The porosity can be derived on the basis of the relationship between the first electrostatic capacity (and the second electrostatic capacity) measured as described above and a porosity of the insulating coating 20 examined in advance. Specifically, the porosity of the insulated electric wire 1 can be estimated by comparing the value of an electrostatic capacity of the insulated electric wire 1 determined in an inspection step with a theoretical curve determined by calculation or a calibration curve determined by using a reference material. The detection of a defective portion described above can be performed by setting, in advance, a threshold value of the electrostatic capacity which is determined from a porosity that should be detected as a defect and which should be determined to show the presence of a defective portion. In addition to the relationship between the electrostatic capacity and the porosity, the relationship between the thickness and the electrostatic capacity can also be referred to as required.

Embodiment 2

Figure 14:
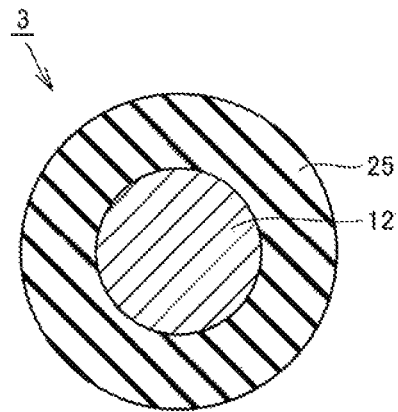
FIG. 14 is a schematic sectional view illustrating an example of an insulated electric wire inspected in Embodiment 2.

Next, Embodiment 2, which is another embodiment, will be described. FIG. 14 is a schematic sectional view illustrating an example of an insulated electric wire inspected in Embodiment 2. An insulated electric wire 3 has a circular sectional shape in a section perpendicular to the longitudinal direction of a conductor 12 having a linear shape. The insulated electric wire 3 includes the linear conductor 12 having a circular sectional shape and an insulating coating 25 formed on the outer peripheral side of the conductor 12. The insulated electric wire 3 inspected in Embodiment 2 differs from the insulated electric wire inspected in Embodiment 1 in that the insulating coating 25 has no pores. Embodiment 2 differs from Embodiment 1 in that the low-porosity portion 21 illustrated in FIG. 8 is not substantially generated in the insulated electric wire 3 including the insulating coating 25 that has substantially no pores. Embodiment 2 is common to Embodiment 1 except for the above point.

In Embodiment 2, the insulated electric wire 3 including the insulating coating 25 that has substantially no pores is inspected instead of the insulated electric wire 1. In the insulated electric wire 3 including the insulating coating 25 that has substantially no pores, a thin-wall portion 22 having a length of 4 mm or less in the longitudinal direction of a conductor 12 can also be generated. A method for inspecting an insulated electric wire 3 according to Embodiment 2 can also detect a thin-wall portion 22 having a length of 4 mm or less in the longitudinal direction of the conductor 12. It is also possible to similarly detect a scratch 23 and a hole 24 that have a length of 4 mm or less in the longitudinal direction of the conductor 12.

Embodiment 3

Figure 15:
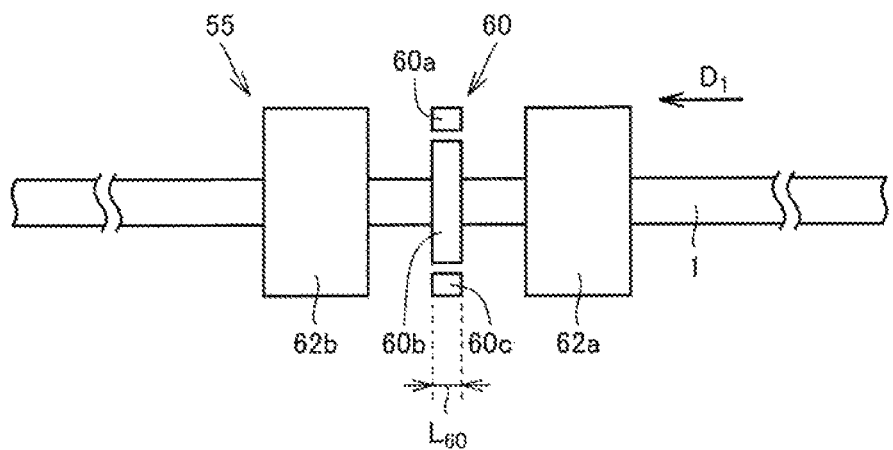
FIG. 15 is a schematic plan view illustrating an example of the structure of an inspection electrode in Embodiment 3.

Next, Embodiment 3, which is another embodiment, will be described. FIG. 15 is a schematic plan view illustrating an example of the structure of an inspection electrode 55 in Embodiment 3. A method for inspecting an insulated electric wire 1 according to this embodiment is basically performed as in the case of Embodiment 1 and achieves similar advantages. However, the inspection electrode 55 of a capacitance sensor 2 in Embodiment 3 differs from that in Embodiment 1 in that the inspection electrode 55 is constituted by one main electrode 60 and two guard electrodes 62a and 62b.

Referring to FIG. 15, a third main electrode 60 serving as a first electrode in this embodiment has the same structure as the first main electrode 40 according to Embodiment 1. Specifically, the third main electrode 60 is constituted by four electrode units 60a, 60b, 60c, and 60d (60d is not illustrated) which are divided into four portions so as to be separated from each other in the circumferential direction of the conductor 10 in a section perpendicular to the longitudinal direction of the conductor 10, each of which has a circular arc-like shape in the section, and each of which extends in the longitudinal direction of the conductor 10. The length of the third main electrode 60 in the longitudinal direction of the conductor 10 is adjusted such that, in an insulating coating, a defective portion having a length of 4 mm or less, preferably 2 mm or less, and more preferably 1 mm or less in the longitudinal direction of the conductor 10 is detectable. Specifically, a length $L_{60}$ of the third main electrode 60 in the longitudinal direction of the conductor 10 is determined to be 0.1 mm or more and preferably 10 mm or less, and more preferably 5 mm or less in this embodiment.

A fourth guard electrode 62a is disposed on the upstream side in the longitudinal direction of the conductor 10 as viewed from the third main electrode 60. A fifth guard electrode 62b is disposed on the downstream side in the longitudinal direction of the conductor 10 as viewed from the third main electrode 60. The fourth guard electrode 62a and the fifth guard electrode 62b each have the same structure and the same function as the first guard electrode 42a, the second guard electrode 42b, and the third guard electrode 42c according to Embodiment 1.

According to an inspection electrode 55 in this embodiment, the length $L_{60}$ in the longitudinal direction of the conductor 10 is short enough (preferably 10 mm or less). Therefore, it is possible to detect a defective portion having a length of 4 mm or less, preferably 2 mm or less, and more preferably 1 mm or less in the longitudinal direction of the conductor 10, such as a very small low-porosity portion 21 or thin-wall portion 22, as in Embodiment 1.

The third main electrode 60 is constituted by the four electrode units 60a, 60b, 60c, and 60d which are divided into four portions so as to be separated from each other in the circumferential direction of the conductor 10 in a section perpendicular to the longitudinal direction of the conductor 10, each of which has a circular arc-like shape in the section, and each of which extends in the longitudinal direction of the conductor 10, as in the first main electrode 40 and the second main electrode 41. Accordingly, a position at which a defective portion is present can also be finely specified in the circumferential direction of the insulated electric wire 1.

Embodiment 4

Figure 16:
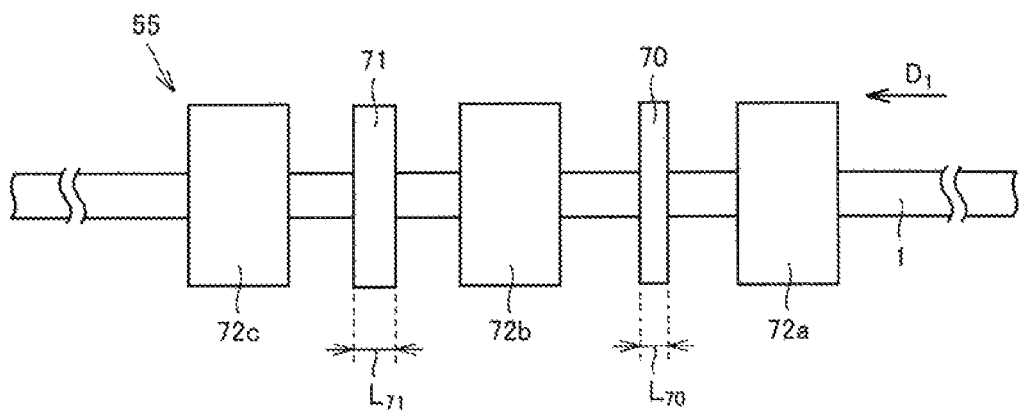
FIG. 16 is a schematic plan view illustrating an example of the structure of an inspection electrode in Embodiment 4.

Next, Embodiment 4, which is another embodiment, will be described. FIG. 16 is a schematic plan view illustrating an example of the structure of an inspection electrode 55 in Embodiment 4. A method for inspecting an insulated electric wire 1 according to this embodiment is basically performed as in the case of Embodiment 1 and achieves similar advantages. However, the inspection electrode 55 of a capacitance sensor 2 in Embodiment 4 differs from that in Embodiment 1 in that two main electrodes 70 and 71 each have a ring-like shape that is continuously connected in the circumferential direction in a section perpendicular to the longitudinal direction of the conductor 10.

Referring to FIG. 16, a length $L_{70}$ of a fourth main electrode 70 serving as a first electrode in this embodiment in the longitudinal direction of the conductor 10 is equal to the length $L_{40}$ of the first main electrode 40 according to Embodiment 1. A length $L_{71}$ of a fifth main electrode 71 serving as a second electrode in this embodiment in the longitudinal direction of the conductor 10 is equal to the length $L_{41}$ of the second main electrode 41 according to Embodiment 1 in the longitudinal direction of the conductor 10. The lengths of the fourth main electrode 70 and the fifth main electrode 71 in the longitudinal direction of the conductor 10 are adjusted such that, in an insulating coating, a defective portion having a length of 4 mm or less, preferably 2 mm or less, and more preferably 1 mm or less in the longitudinal direction of the conductor 10 is detectable. Specifically, the length $L_{70}$ and the length $L_{71}$ are each determined to be 0.1 mm or more and preferably 10 mm or less, and more preferably 5 mm or less. The length $L_{71}$ is longer than the length $L_{70}$.

A sixth guard electrode 72a is disposed on the upstream side in the longitudinal direction of the conductor 10 as viewed from the fourth main electrode 70. A seventh guard electrode 72b is disposed between the fourth main electrode 70 and the fifth main electrode 71 in the longitudinal direction of the conductor 10. An eighth guard electrode 72c is disposed on the downstream side in the longitudinal direction of the conductor 10 as viewed from the fifth main electrode 71. The sixth guard electrode 72a, the seventh guard electrode 72b, and the eighth guard electrode 72c have the same structure and the same function as the first guard electrode 42a, the second guard electrode 42b, and the third guard electrode 42c, respectively, according to Embodiment 1.

According to the inspection electrode 55 in this embodiment, the length $L_{70}$ of the fourth main electrode 70 in the longitudinal direction of the conductor 10 of the insulated electric wire 1 is short enough (preferably 10 mm or less). Therefore, it is possible to detect a defective portion having a length of 4 mm or less, preferably 2 mm or less, and more preferably 1 mm or less in the longitudinal direction of the conductor 10, such as a very small low-porosity portion 21 or thin-wall portion 22, as in Embodiment 1. Furthermore, since the length $L_{70}$ of the fourth main electrode 70 in the longitudinal direction of the conductor 10 is preferably 0.1 mm or more, the detection of a defective portion can be performed with higher accuracy.

The inspection electrode 55 in this embodiment includes a plurality of main electrodes (the fourth main electrode 70 and the fifth main electrode 71). Accordingly, the formation state of the insulating coating 20 in a narrower range can be inspected by determining the first electrostatic capacity and the second electrostatic capacity measured with the two main electrodes and by comparing inspection results based on the electrostatic capacities (by determining the difference between the two electrostatic capacities). Specifically, the formation state of the insulating coating 20 in a more local range that substantially corresponds to the difference between $L_{70}$ and $L_{71}$ (for example, 10 mm or less, and 5 mm as a specific example) can be inspected by determining the first electrostatic capacity between the fourth main electrode 70 having a length of $L_{70}$ and the insulated electric wire 1 and the second electrostatic capacity between the fifth main electrode 71 having a length $L_{71}$ and the insulated electric wire 1, and by comparing inspection results based on the electrostatic capacities (by determining the difference between the two electrostatic capacities).

Embodiment 5

Figure 17:
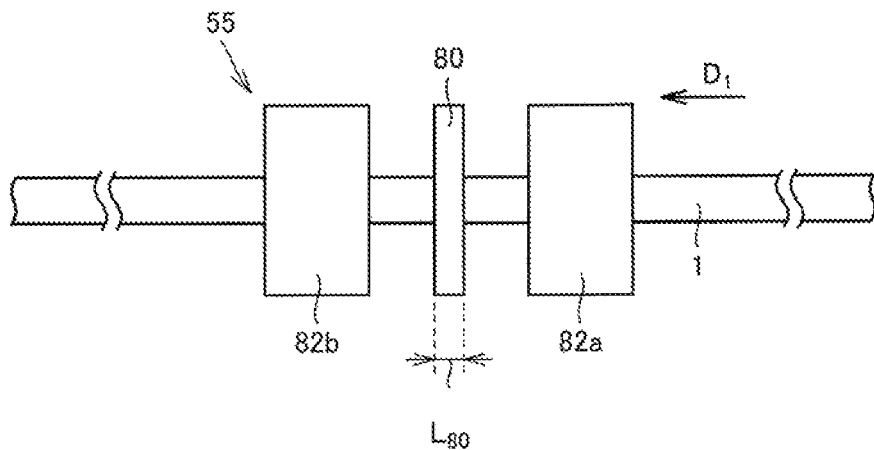
FIG. 17 is a schematic plan view illustrating an example of the structure of an inspection electrode in Embodiment 5.

Next, Embodiment 5, which is another embodiment, will be described. FIG. 17 is a schematic plan view illustrating an example of the structure of an inspection electrode 55 in Embodiment 5. A method for inspecting an insulated electric wire 1 according to this embodiment is basically performed as in the case of Embodiment 1 and achieves similar advantages. However, the inspection electrode 55 of a capacitance sensor 2 in Embodiment 5 differs from that in Embodiment 1 in that a main electrode (sixth main electrode 80) has a ring-like shape that is respectively continuously connected in the circumferential direction in a section perpendicular to the longitudinal direction of the conductor 10, and that the inspection electrode 55 is constituted by the one main electrode (sixth main electrode 80) and two guard electrodes 82a and 82b.

Referring to FIG. 17, in this embodiment, a length $L_{80}$ of the sixth main electrode 80 serving as a first electrode in the longitudinal direction of the conductor 10 is preferably 0.1 mm or more and 10 mm or less as in the length $L_{40}$ of the first main electrode 40 according to Embodiment 1 in the longitudinal direction of the conductor 10.

A ninth guard electrode 82a is disposed on the upstream side in the longitudinal direction of the conductor 10 as viewed from the sixth main electrode 80. A tenth guard electrode 82b is disposed on the downstream side in the longitudinal direction of the conductor 10 as viewed from the sixth main electrode 80. The ninth guard electrode 82a and the tenth guard electrode 82b each have the same structure and the same function as the first guard electrode 42a, the second guard electrode 42b, and the third guard electrode 42c according to Embodiment 1.

In the inspection electrode 55 according to this embodiment, the length of the sixth main electrode 80 in the longitudinal direction of the conductor 10 is adjusted such that, in an insulating coating, a defective portion having a length of 4 mm or less, preferably 2 mm or less, and more preferably 1 mm or less in the longitudinal direction of the conductor 10 is detectable. The length $L_{80}$ of the sixth main electrode 80 in the longitudinal direction of the conductor 10 is short enough (preferably 10 mm or less). Accordingly, as in Embodiment 1, a defective portion having a length of 4 mm or less, preferably 2 mm or less, and more preferably 1 mm or less in the longitudinal direction of the conductor 10, such as a very small low-porosity portion 21 or thin-wall portion 22 can be detected, although, unlike Embodiment 1, it is difficult to finely specify a position at which a defective portion is present in the circumferential direction of the insulated electric wire 1 and to inspect in a smaller range as in the case where inspection results are compared by using a plurality of electrodes.

Embodiment 6

Figure 18:
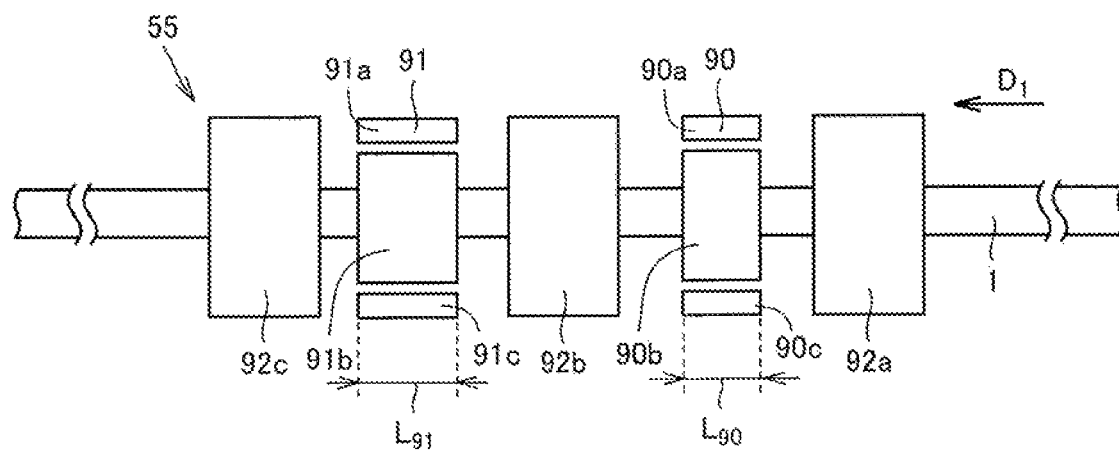
FIG. 18 is a schematic plan view illustrating an example of the structure of an inspection electrode in Embodiment 6.

Next, Embodiment 6, which is another embodiment, will be described. FIG. 18 is a schematic plan view illustrating an example of the structure of an inspection electrode 55 in Embodiment 6. A method for producing an insulated electric wire 1 according to this embodiment is basically performed as in the case of Embodiment 1 and achieves similar advantages. However, the inspection electrode 55 of a capacitance sensor 2 in Embodiment 6 differs from that in Embodiment 1 in that a length $L_{90}$ of a seventh main electrode 90 and a length $L_{91}$ of an eighth main electrode 91 each exceed 10 mm.

Referring to FIG. 18, the inspection electrode 55 includes a seventh main electrode 90 serving as a first electrode and an eighth main electrode 91 serving as a second electrode. The seventh main electrode 90 is constituted by four electrode units 90a, 90b, 90c, and 90d which are divided into four portions so as to be separated from each other in the circumferential direction of the conductor 10 in a section perpendicular to the longitudinal direction of the conductor 10, each of which has a circular arc-like shape in the section, and each of which extends in the longitudinal direction of the conductor 10 (as in the electrode unit 40d, the electrode unit 90d is located on the opposite side of the electrode unit 90b with the insulated electric wire 1 therebetween and is not illustrated). The eighth main electrode 91 is also constituted by four electrode units 91a, 91b, 91c, and 91d which have a similar sectional shape and extend in the longitudinal direction of the conductor 10 (as in the electrode unit 40d, the electrode unit 91d is located on the opposite side of the electrode unit 91b with the insulated electric wire 1 therebetween and is not illustrated).

A length $L_{90}$ of the seventh main electrode 90 in the longitudinal direction of the conductor 10 is different from a length $L_{91}$ of the eighth main electrode 91 in the same direction. The length $L_{91}$ is longer than the length $L_{90}$.

Each of the electrode units of the seventh main electrode 90 and the eighth main electrode 91 is connected to the capacitance monitor 58 (FIG. 2) with a wiring line therebetween. For the sake of convenience of explanation, illustration of the wiring lines connected to the electrodes is omitted in FIG. 18.

An eleventh guard electrode 92a is disposed on the upstream side in the longitudinal direction of the conductor 10 as viewed from the seventh main electrode 90. A twelfth guard electrode 92b is disposed between the seventh main electrode 90 and the eighth main electrode 91 in the longitudinal direction of the conductor 10. A thirteenth guard electrode 92c is disposed on the downstream side in the longitudinal direction of the conductor 10 as viewed from the eighth main electrode 91. The eleventh guard electrode 92a, the twelfth guard electrode 92b, and the thirteenth guard electrode 92c have the same structure and the same function as the first guard electrode 42a, the second guard electrode 42b, and the third guard electrode 42c, respectively, according to Embodiment 1.

In a step of inspecting the formation state of an insulating coating 20, a voltage is applied to each of the seventh main electrode 90 and the eighth main electrode 91 to detect a first electrostatic capacity between the insulated electric wire 1 and each of the electrode units 90a, 90b, 90c, and 90d of the seventh main electrode 90 and a second electrostatic capacity between the insulated electric wire 1 and each of the electrode units 91a, 91b, 91c, and 91d of the eighth main electrode 91. The formation state of the insulating coating 20 is inspected on the basis of the relationship between the porosity of the insulating coating 20 and the first electrostatic capacity and second electrostatic capacity detected above.

In this embodiment, the first electrostatic capacity and the second electrostatic capacity are measured by using the capacitance sensor 2 including the inspection electrode 55 that has a plurality of main electrodes, namely, the seventh main electrode 90 and the eighth main electrode 91. Since the inspection is performed with the plurality of main electrodes in this manner, whether or not inspection results obtained by one of the main electrodes include false detection of a defect can be examined by comparing with inspection results obtained by another main electrode. As a result, false detection of defects is reduced, and defects can be detected with higher accuracy.

Furthermore, the length of the seventh main electrode 90 and the length of the eighth main electrode 91 are different from each other. Accordingly, the formation state of the insulating coating 20 in a narrower range can be inspected by determining the first electrostatic capacity and the second electrostatic capacity measured with the two main electrodes and by comparing inspection results based on the electrostatic capacities (by determining the difference between the two electrostatic capacities). Specifically, the formation state of the insulating coating 20 in a range substantially corresponding to the difference ($L_{91}-L_{90}$) (for example, 1 mm) can be inspected by determining the first electrostatic capacity between the seventh main electrode 90 having a length of $L_{90}$ and the insulated electric wire 1 and the second electrostatic capacity between the eighth main electrode 91 having a length $L_{91}$ longer than the length $L_{90}$ and the insulated electric wire 1, and by comparing inspection results based on the electrostatic capacities (by determining the difference between the two electrostatic capacities).

The seventh main electrode 90 is constituted by four electrode units 90a, 90b, 90c, and 90d which are divided into four portions so as to be separated from each other in the circumferential direction of the conductor 10 in a section perpendicular to the longitudinal direction of the conductor 10, each of which has a circular arc-like shape in the section, and each of which extends in the longitudinal direction of the conductor 10. Similarly, the eighth main electrode 91 is also constituted by four electrode units 91a, 91b, 91c, and 91d that are divided into four portions in the circumferential direction. The use of the seventh main electrode 90 and the eighth main electrode 91 each constituted by a plurality of electrode units that are divided in the circumferential direction enables a position at which a defect is present to be also finely specified in the circumferential direction of the insulated electric wire 1.

Embodiment 7

Figure 19:
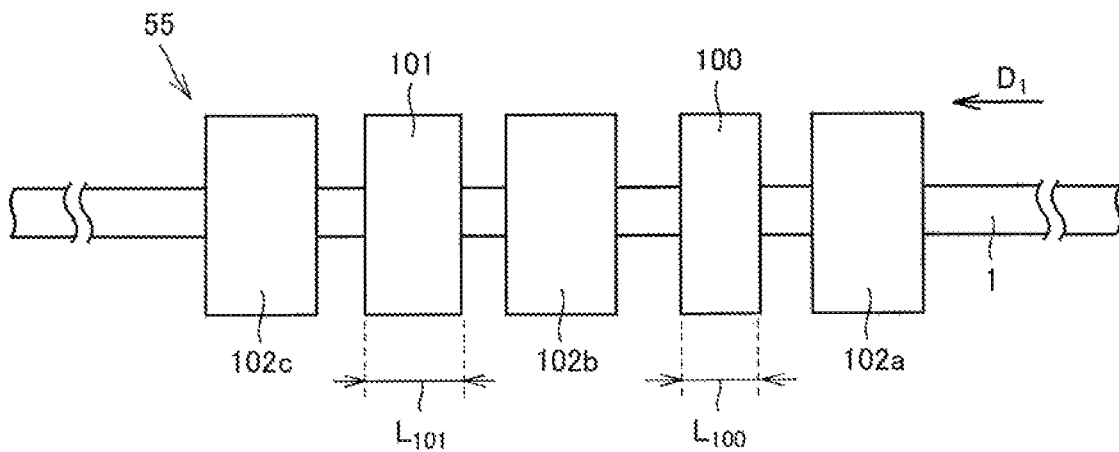
FIG. 19 is a schematic plan view illustrating an example of the structure of an inspection electrode in Embodiment 7.

Next, Embodiment 7, which is another embodiment, will be described. FIG. 19 is a schematic plan view illustrating an example of the structure of an inspection electrode 55 in Embodiment 7. A method for producing an insulated electric wire 1 according to this embodiment is basically performed as in the case of Embodiment 1 and achieves similar advantages. However, the inspection electrode 55 of a capacitance sensor 2 in Embodiment 7 differs from that in Embodiment 1 in that a ninth main electrode 100 and a tenth main electrode 101 each have a ring-like shape that is continuously connected in the circumferential direction in a section perpendicular to the longitudinal direction of the conductor 10, and that a length $L_{100}$ of the ninth main electrode 100 and a length $L_{101}$ of the tenth main electrode 101 each exceed 10 mm.

Referring to FIG. 19, the inspection electrode 55 includes a ninth main electrode 100 serving as a first electrode and a tenth main electrode 101 serving as a second electrode. A length $L_{100}$ and a length $L_{101}$ are different from each other, and the length $L_{101}$ is longer than the length $L_{100}$. The length $L_{100}$ and the length $L_{101}$ each exceed 10 mm. Each of the ninth main electrode 100 and the tenth main electrode 101 is connected to the capacitance monitor 58 (FIG. 2) with a wiring line therebetween. For the sake of convenience of explanation, illustration of the wiring lines connected to the electrodes is omitted in FIG. 19.

A fourteenth guard electrode 102a is disposed on the upstream side in the longitudinal direction of the conductor 10 as viewed from the ninth main electrode 100. A fifteenth guard electrode 102b is disposed between the ninth main electrode 100 and the tenth main electrode 101 in the longitudinal direction of the conductor 10. A sixteenth guard electrode 102c is disposed on the downstream side in the longitudinal direction of the conductor 10 as viewed from the tenth main electrode 101. The fourteenth guard electrode 102a, the fifteenth guard electrode 102b, and the sixteenth guard electrode 102c have the same structure and the same function as the first guard electrode 42a, the second guard electrode 42b, and the third guard electrode 42c, respectively, according to Embodiment 1.

In a step of inspecting the formation state of an insulating coating 20, a voltage is applied to each of the ninth main electrode 100 and the tenth main electrode 101 to detect a first electrostatic capacity between the ninth main electrode 100 and the insulated electric wire 1 and a second electrostatic capacity between the tenth main electrode 101 and the insulated electric wire 1. The formation state of the insulating coating 20 is inspected on the basis of the relationship between the porosity of the insulating coating 20 and the first electrostatic capacity and second electrostatic capacity detected above.

In this embodiment, the first electrostatic capacity and the second electrostatic capacity are measured by using the capacitance sensor 2 including the inspection electrode 55 that has a plurality of main electrodes, namely, the ninth main electrode 100 and the tenth main electrode 101. Since the inspection is performed with the plurality of main electrodes in this manner, whether or not inspection results obtained by one of the main electrodes include false detection of a defect can be examined by comparing with inspection results obtained by another main electrode. As a result, false detection of a defect is reduced, and a defect can be detected with higher accuracy.

Furthermore, the length of the ninth main electrode 100 and the length of the tenth main electrode 101 are different from each other. Accordingly, the formation state of the insulating coating 20 in a narrower range can be inspected by determining the first electrostatic capacity and the second electrostatic capacity measured with the two main electrodes and by comparing inspection results based on the electrostatic capacities (by determining the difference between the two electrostatic capacities). Specifically, the formation state of the insulating coating 20 in a range substantially corresponding to the difference ($L_{101}$–$L_{100}$) (for example, 1 mm) can be inspected by determining the first electrostatic capacity between the ninth main electrode 100 having a length of $L_{100}$ and the insulated electric wire 1 and the second electrostatic capacity between the tenth main electrode 101 having a length $L_{101}$ longer than the length $L_{100}$ and the insulated electric wire 1, and by comparing inspection results based on the electrostatic capacities (by determining the difference between the two electrostatic capacities).

Embodiment 8

Figure 20:
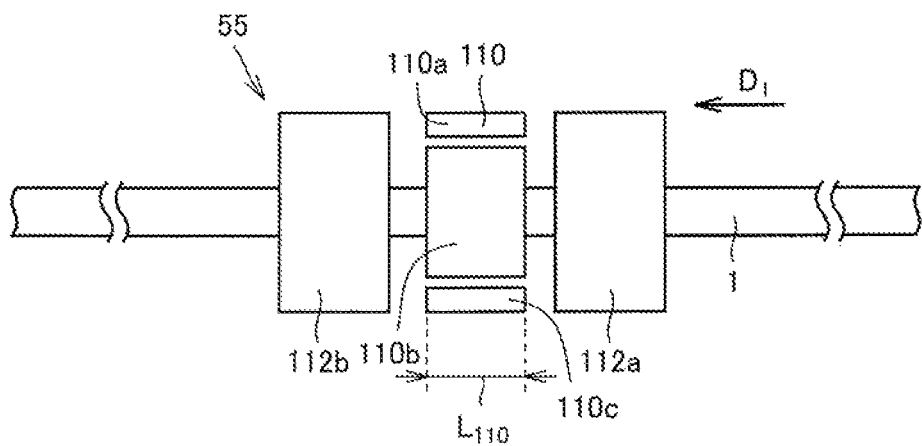
FIG. 20 is a schematic plan view illustrating an example of the structure of an inspection electrode in Embodiment 8.

Next, Embodiment 8, which is another embodiment, will be described. FIG. 20 is a schematic plan view illustrating an example of the structure of an inspection electrode 55 in Embodiment 8. A method for producing an insulated electric wire 1 according to this embodiment is basically performed as in the case of Embodiment 1 and achieves similar advantages. However, the inspection electrode 55 of a capacitance sensor 2 in Embodiment 8 differs from that in Embodiment 1 in that a length $L_{110}$ of an eleventh main electrode 110 exceeds 10 mm, and that the inspection electrode 55 is constituted by one main electrode (eleventh main electrode) 110 and two guard electrodes 112a and 112b.

Referring to FIG. 20, the inspection electrode 55 includes an eleventh main electrode 110 serving as a first electrode. The eleventh main electrode 110 has the same structure as the first main electrode 40 according to Embodiment 1. Specifically, the eleventh main electrode 110 is constituted by four electrode units 110a, 110b, 110c, and 110d (110d is not illustrated) which are divided into four portions so as to be separated from each other in the circumferential direction of the conductor 10 in a section perpendicular to the longitudinal direction of the conductor 10, each of which has a circular arc-like shape in the section, and each of which extends in the longitudinal direction of the conductor 10. The eleventh main electrode 110 has a length $L_{110}$ in the longitudinal direction of the conductor 10. The length $L_{110}$ exceeds 10 mm. Each of the electrode units of the eleventh main electrode 110 is connected to the capacitance monitor 58 (FIG. 2) with a wiring line therebetween. For the sake of convenience of explanation, illustration of the wiring lines connected to the electrodes is omitted in FIG. 20.

A seventeenth guard electrode 112a is disposed on the upstream side in the longitudinal direction of the conductor 10 as viewed from the eleventh main electrode 110. An eighteenth guard electrode 112b is disposed on the downstream side in the longitudinal direction of the conductor 10 as viewed from the eleventh main electrode 110. The seventeenth guard electrode 112a and the eighteenth guard electrode 112b each have the same structure and the same function as the first guard electrode 42a, the second guard electrode 42b, and the third guard electrode 42c according to Embodiment 1.

In a step of inspecting the formation state of an insulating coating 20, a voltage is applied to the eleventh main electrode 110 to detect a first electrostatic capacity between the insulated electric wire 1 and each of the electrode units 110a, 110b, 110c, and 110d of the eleventh main electrode 110. The formation state of the insulating coating 20 is inspected on the basis of the relationship between the porosity of the insulating coating 20 and the first electrostatic capacity.

Referring to FIG. 20, the eleventh main electrode 110 serving as the first electrode in this embodiment is constituted by four electrode units 110a, 110b, 110c, and 110d which are divided into four portions so as to be separated from each other in the circumferential direction of the conductor 10 in a section perpendicular to the longitudinal direction of the conductor 10, each of which has a circular arc-like shape in the section, and each of which extends in the longitudinal direction of the conductor 10. The use of the eleventh main electrode 110 constituted by a plurality of electrode units that are divided in the circumferential direction enables a position at which a defect is present to be also finely specified in the circumferential direction of the insulated electric wire 1.

In each of the embodiments described above, a description has been made of a method for inspecting a linear insulated electric wire 1 having a circular sectional shape. However, the sectional shape of the insulated electric wire 1 is not limited thereto. Insulated electric wires that are processed to have any sectional shape such as a quadrangular shape or a hexagonal shape can also be obtained.

In the embodiments described above, the length of each main electrode in the longitudinal direction of the conductor 10 is not particularly limited but is preferably 10 mm or less. When a plurality of main electrodes are included, at least one of the lengths is preferably 10 mm or less.

In the embodiments described above, the inspection part 53 for detecting an electrostatic capacity is arranged at a position immediately before an insulated electric wire is coiled in the coiling part 56. However, the position at which the inspection part 53 is arranged is not limited to this position. For example, in the case where an insulating coating 20 is formed by forming a plurality of insulating layers on a conductor 10, the inspection part 53 may be arranged, instead of the position immediately before an insulated electric wire is coiled in the coiling part 56 or in addition to the position immediately before an insulated electric wire is coiled in the coiling part 56, at a position at which an electrostatic capacity can be detected at a stage of an intermediate product before the insulating coating 20 is completed.

In the embodiments described above, the lengths of the guard electrodes in the longitudinal direction of the conductor 10 are equal to each other. However, the lengths of the guard electrodes may be different from each other. Alternatively, the guard electrodes may be omitted within a range that does not affect the detection of a defective portion.

In the embodiments described above, the insulating coatings 20 and 25 are formed by a method in which a varnish applied to surfaces of the conductors 10 and 12 is heated in a baking furnace. However, the method for forming the insulating coatings 20 and 25 is not limited to this method. For example, the insulating coatings 20 and 25 can be formed by extrusion molding of a thermoplastic resin. Regarding a method for forming the pores 15, not only a method for forming pores 15 utilizing decomposition of a thermally decomposable resin but also other methods can be employed. For example, the pores 15 can also be formed in the insulating coating 20 by using a phase separation method (a method for forming a large number of pores, the method including performing microphase separation from a homogeneous solution of a polymer and a solvent, and subsequently removing the solvent by extraction) or a supercritical method (a method for forming a porous body by using a supercritical fluid).

Embodiment 9

Next, Embodiment 9 will be described with reference to FIG. 1 and FIGS. 21 to 25. In the following drawings, the same or corresponding parts are denoted by the same reference numerals, and a description thereof is not repeated.

[Structure of Insulated Electric Wire]

Figure 21:
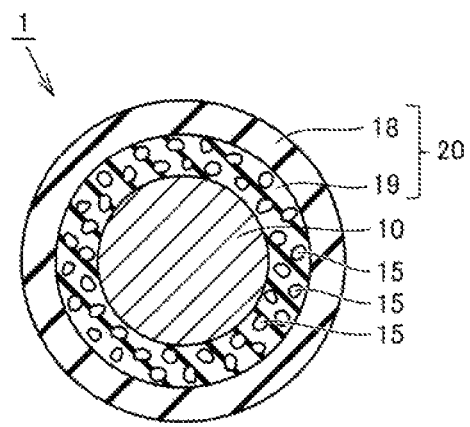
FIG. 21 is a schematic sectional view illustrating an example of an insulated electric wire.
Figure 22:
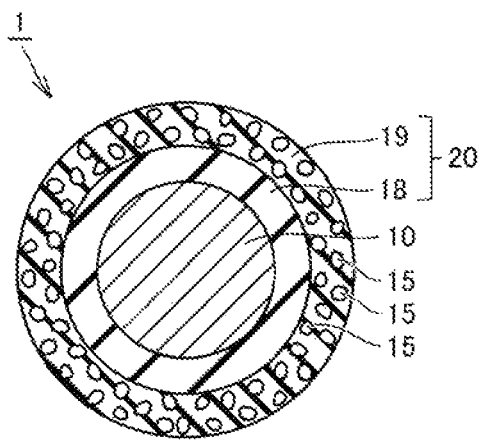
FIG. 22 is a schematic sectional view illustrating an example of an insulated electric wire.

Examples of insulated electric wires produced in this embodiment are illustrated in FIGS. 1, 21, and 22. FIGS. 1, 21, and 22 are each a schematic sectional view illustrating an example of an insulated electric wire. Referring to FIG. 1, an insulated electric wire 1 having a circular sectional shape includes a linear conductor 10 having a circular sectional shape and an insulating coating 20 covering the conductor 10 so as to cover a surface on the outer peripheral side of the conductor 10. The insulating coating 20 is formed of an insulator containing an organic material. Examples of the organic material contained in the insulator include, but are not particularly limited to, polyimide (PI), polyamide-imide (PAI), polyethersulfone (PES), and polyetheretherketone (PEEK). In particular, the insulator constituting the insulating coating 20 preferably one containing polyimide or polyamide-imide in view of good insulating properties and heat resistance. For example, the insulating coating 20 in this embodiment is made of polyimide. Referring to FIG. 1, the insulating coating 20 in this embodiment includes pores 15 therein. A ratio of the total volume of the pores 15 relative to the entire volume of the insulating coating 20 (porosity) is generally 5% by volume or more and 80% by volume or less, preferably 10% by volume or more and 60% by volume or less, and more preferably 25% by volume or more and 55% by volume or less. Since air and the material constituting the insulating coating 20 such as polyimide have different dielectric constants, the dielectric constant of the whole insulating coating 20 changes when the insulating coating 20 has the pores 15. For example, polyimide has a dielectric constant (relative dielectric constant) higher than air. Accordingly, when the insulating coating 20 is made of polyimide, an insulating coating 20 having a dielectric constant lower than an insulating coating 20 that has no pores 15 can be obtained by providing the insulating coating 20 with pores 15.

The insulated electric wire 1 may have pores 15 evenly across the thickness direction of the insulating coating 20, as illustrated in FIG. 1. Alternatively, as illustrated in FIG. 21 or FIG. 22, an insulating coating 20 may have a multilayer structure that includes a solid layer 18 and a porous layer 19 having pores 15. An insulated electric wire 1 illustrated in FIG. 21 or FIG. 22 includes a linear conductor 10 having a circular sectional shape and an insulating coating 20 that covers the conductor 10 so as to cover a surface on the outer peripheral side of the conductor 10 as in the insulated electric wire 1 illustrated in FIG. 1. However, the insulating coating 20 of the insulated electric wire 1 illustrated in FIG. 21 has a multilayer structure that includes a porous layer 19 having pores 15 and formed so as to cover the outer peripheral surface of the conductor 10 and a solid layer 18 formed so as to cover the outer peripheral surface of the porous layer 19. The insulating coating 20 of the insulated electric wire 1 illustrated in FIG. 22 has a multilayer structure that includes a solid layer 18 formed so as to cover the outer peripheral surface of the conductor 10 and a porous layer 19 having pores 15 and formed so as to cover the outer peripheral surface of the solid layer 18. Although not illustrated in the figures, the insulating coating 20 may have a multilayer structure in which solid layers 18 and porous layers 19 are alternately formed toward the outside in the radial direction of the insulated electric wire 1 having a circular sectional shape. The thickness of the solid layer 18 and the thickness of the porous layer 19 can be appropriately determined depending on required properties.

Figure 23:
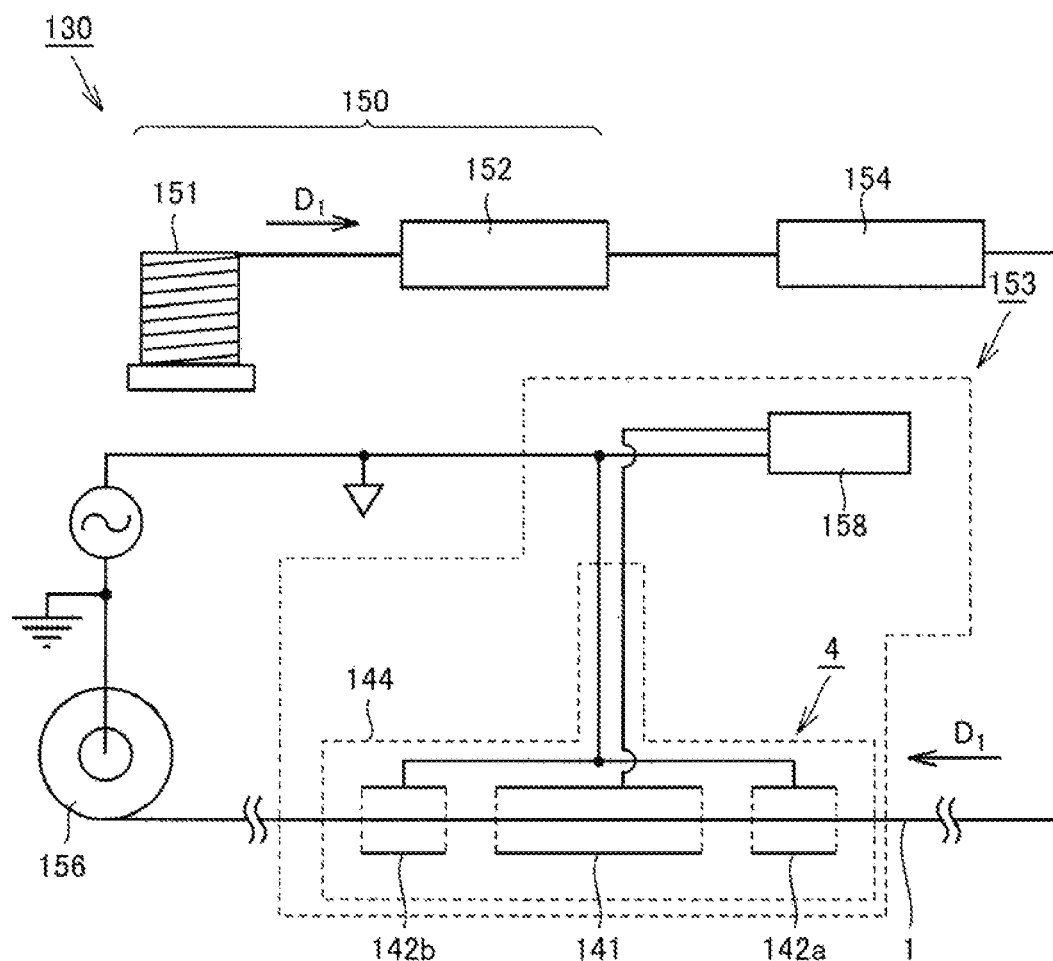
FIG. 23 is a block diagram for explaining steps of producing an insulated electric wire in Embodiment 9.
Figure 24:
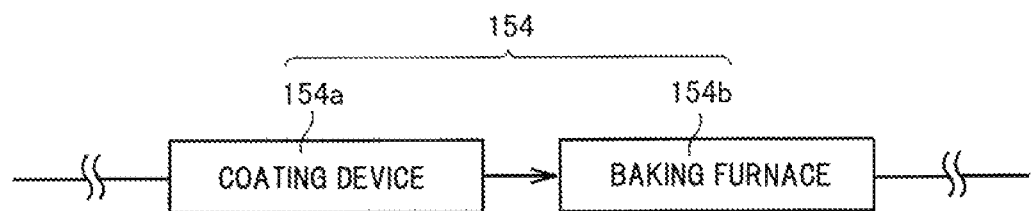
FIG. 24 is a block diagram for explaining an insulating coating formation part in Embodiment 9.
Figure 25:
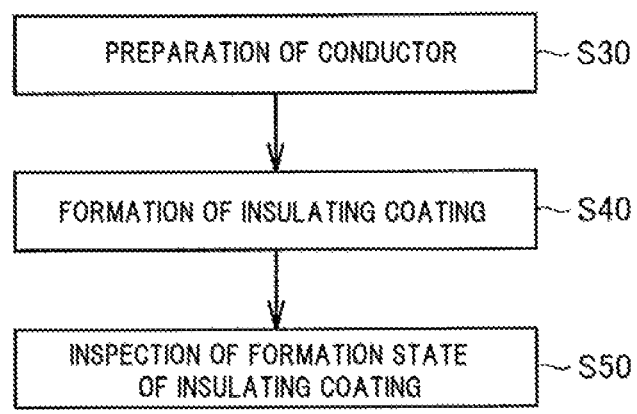
FIG. 25 is a flowchart illustrating a procedure of a method for producing an insulated electric wire in Embodiment 9.

Next, a flow of a method for producing an insulated electric wire 1 according to this embodiment will be described with reference to FIGS. 23 to 25. FIG. 23 is a block diagram for explaining steps of producing an insulated electric wire 1 in Embodiment 9. FIG. 24 is a block diagram for explaining an insulating coating formation part in Embodiment 9. FIG. 25 is a flowchart illustrating a procedure of a method for producing an insulated electric wire 1 in Embodiment 9.

Referring to FIG. 23, a production apparatus 130 of an insulated electric wire 1 includes a conducting wire preparation part 150, an insulating coating formation part 154, an inspection part 153, and a coiling part 156. The conducting wire preparation part 150 to the coiling part 156 are arranged side by side. An inspection of the insulated electric wire 1 is performed in the inspection part 153. The conducting wire preparation part 150 includes an element wire supply part 151 and a conducting wire-processing part 152. First, an element wire such as a copper wire is supplied from the element wire supply part 151. The element wire is fed in the direction of arrow $D_1$ and is processed in the conducting wire-processing part 152 to have a desired shape. A conductor 10 that has been processed from the element wire in the conducting wire-processing part 152 is fed to the insulating coating formation part 154.

Referring to FIG. 24, the insulating coating formation part 154 includes, for example, a coating device 154a configured to apply a varnish serving as a raw material of an insulating coating 20 to the conductor 10 and a baking furnace 154b serving as a heating part and configured to heat the resulting coating film to form a polyimide coating. The insulating coating 20 is formed on the surface of the conductor 10 in the insulating coating formation part 154. Thus, an insulated electric wire 1 including the conductor 10 and the insulating coating 20 covering the conductor 10 is obtained. The resulting insulated electric wire 1 is further fed in the direction of arrow $D_1$, and the formation state of the insulating coating 20 is inspected.

The inspection part 153 is disposed on the downstream side of the insulating coating formation part 154. In the inspection part 153, an electrostatic capacity of the insulated electric wire 1 is detected, and the formation state of the insulating coating 20 is inspected on the basis of the relationship between the electrostatic capacity and the porosity of the insulating coating 20. A capacitance sensor 4 illustrated in FIG. 23 is used for the inspection. The capacitance sensor 4 is disposed such that the insulated electric wire 1 passes through the capacitance sensor 4, and the electrostatic capacity of the insulated electric wire 1 is detected. The data of the detected electrostatic capacity is transmitted to a capacitance monitoring device 158. The formation state of the insulating coating 20 is inspected on the basis of the relationship between the electrostatic capacity displayed on the capacitance monitoring device 158 and the porosity of the insulating coating 20.

The insulated electric wire 1 that has been inspected in the inspection part 153 is subsequently coiled in the coiling part 156.

The capacitance sensor 4 includes a main electrode 141 serving as a first electrode, a first guard electrode 142a, a second guard electrode 142b, and a housing 144. The main electrode 141, the first guard electrode 142a, and the second guard electrode 142b each have a hollow cylindrical shape through which the insulated electric wire 1 can pass. The housing 144 has a shape capable of housing the main electrode 141, the first guard electrode 142a, the second guard electrode 142b, and wiring lines connected to the electrodes.

The main electrode 141 is disposed on the outer peripheral side of the insulated electric wire 1. The main electrode 141 is connected to the capacitance monitoring device 158. In a step of inspecting the formation state of an insulating coating 20, a voltage is applied to the main electrode 141 to detect a first an electrostatic capacity of the insulated electric wire 1.

The first guard electrode 142a is disposed on the insulating coating formation part 154 side (upstream side) in the longitudinal direction of the insulated electric wire 1 as viewed from the main electrode 141. The second guard electrode 142b is disposed on the coiling part 156 side (downstream side) in the longitudinal direction of the insulated electric wire 1 as viewed from the main electrode 141. The first guard electrode 142a and the second guard electrode 142b are provided in order to reduce concentration of an electric field at end portions of the main electrode 141 and to stably measure a numerical value of the electrostatic capacity generated between the insulated electric wire 1 and the main electrode 141. The first guard electrode 142a and the second guard electrode 142b are connected to each other. The first guard electrode 142a and the second guard electrode 142b are connected to the capacitance monitoring device 158 and the coiling part 156 and grounded in a path between the coiling part 156 and the first guard electrode 142a and the second guard electrode 142b. That is, the first guard electrode 142a and the second guard electrode 142b are ground electrodes.

Next, a procedure of a method for producing an insulated electric wire 1 will be described with reference to FIGS. 23 to 25. Steps S30 to S50 shown in FIG. 25 are performed in the method for producing an insulated electric wire 1 according to this embodiment. Referring to FIGS. 23 and 25, first, a linear conductor 10 having a circular sectional shape is prepared in a conducting wire preparation part 150 (S30). Specifically, an element wire held by an element wire supply part 151 is pulled out from the element wire supply part 151 and processed in a conducting wire-processing part 152 to have a desired shape. The material of the conductor 10 is, for example, copper.

Next, an insulating coating 20 is formed (S40). The insulating coating 20 is formed so as to cover a surface on the outer peripheral side of the conductor 10 having a linear shape. The insulating coating 20 is formed of an insulator and includes pores 15 therein. The insulating coating 20 including the pores 15 therein is formed as described below. For example, a case where the insulator is made of polyimide will be described. First, a prepolymer of polyimide, which is a precursor of polyimide, is prepared. A thermally decomposable resin that decomposes at a temperature lower than a curing temperature of the polyimide is mixed with the prepolymer to prepare a mixture (varnish) of the polyimide prepolymer and the thermally decomposable resin. The prepared varnish is applied to a surface of a conductor 10 to form a coating film on the surface of the conductor 10. Heating of this coating film accelerates a reaction from the polyimide prepolymer to polyimide. Since the polyimide is thermosetting, the coating film is cured by heating. In addition, the thermally decomposable resin is decomposed and vaporized by heating. As a result, pores 15 are formed at positions at which the thermally decomposable resin has been present in the cured coating film made of the polyimide. Thus, an insulating coating 20 including the pores 15 therein and made of polyimide, which is an insulator, is formed so as to cover a surface on the outer peripheral side of the conductor 10. An insulated electric wire 1 including the conductor 10 and the insulating coating 20 covering the conductor 10 is obtained by the procedure described above.

An insulating coating 20 having a multilayer structure that includes a solid layer 18 and a porous layer 19 having pores 15 as illustrated in FIG. 21 or FIG. 22 can be formed on the outer peripheral side of the conductor 10 by a procedure described below. First, a prepolymer of polyimide, which is a precursor of polyimide, is prepared. Next, a first varnish that is obtained by mixing a thermally decomposable resin with the prepolymer and that contains both the prepolymer and the thermally decomposable resin and a second varnish that contains the prepolymer but that contains no thermally decomposable resin are prepared. When the porous layer 19 is formed, the first varnish is applied and heated. The thermally decomposable resin is decomposed and vaporized by heating, and pores 15 are formed in the cured coating film made of polyimide. Consequently, the porous layer 19 is formed. When the solid layer 18 is formed, the second varnish is applied and heated. Consequently, the solid layer 18 is formed. Repeating this procedure enables an insulating coating 20 having a multilayer structure in which porous layers 19 and solid layers 18 are formed in a desired order to be formed so as to cover a surface on the outer peripheral side of the conductor 10.

Subsequent to step S40 of forming the insulating coating 20, the resulting insulated electric wire 1 is inspected (S50). In step S50, an electrostatic capacity of the insulated electric wire 1 is detected, and the formation state of the insulating coating 20 is inspected on the basis of the relationship between the electrostatic capacity and the porosity of the insulating coating 20 (the ratio of the total volume of the pores 15 relative to the entire volume of the insulating coating 20). The inspection is performed online. Regarding the inspection performed online, in the series of the steps from step S30 to step S50, the formation state of the insulating coating 20 obtained in step S40 is continuously inspected subsequent to step S40. When the inspection is performed online, a series of flow from the element wire supply part 151 to the coiling part 156 illustrated in FIG. 23 is successively performed without cutting the insulated electric wire 1.

In the step of inspecting the formation state of the insulating coating 20, a voltage is applied to a main electrode 141 in a state in which a measurement part (capacitance sensor 4) is immersed in water, and the electrostatic capacity of the insulated electric wire 1 is monitored. The electrostatic capacity of the insulated electric wire 1 is monitored by a capacitance monitoring device 158 connected to the main electrode 141. In this embodiment, the formation state of the insulating coating 20 is inspected on the basis the relationship between the electrostatic capacity of the insulated electric wire 1 and the porosity of the insulating coating 20. Specifically, the porosity of the insulated electric wire 1 can be estimated by comparing the value of the electrostatic capacity of the insulated electric wire 1 determined in the inspection step with a theoretical curve determined by calculation or a calibration curve determined by using a reference material. The formation state of the insulating coating 20 is evaluated from the estimated porosity, and whether or not an insulated electric wire 1 having a predetermined porosity has been obtained can be determined. The inspected insulated electric wire 1 is subsequently coiled in a coiling part 156.

Embodiments of the present invention have been described above. In each of the embodiments described above, a description has been made of a production method and an inspection method of a linear insulated electric wire 1 having a circular sectional shape. However, the sectional shape of the insulated electric wire 1 is not limited thereto. Insulated electric wires that are processed to have any sectional shape such as a quadrangular shape or a hexagonal shape can also be obtained.

In the embodiments described above, the length of each main electrode in the longitudinal direction of the conductor 10 is not particularly limited but is preferably 10 mm or less. When a plurality of main electrodes are included, at least one of the lengths is preferably 10 mm or less.

In the embodiments described above, the inspection part 153 for detecting an electrostatic capacity is arranged at a position immediately before an insulated electric wire is coiled in the coiling part 156. However, the position at which the inspection part 153 is arranged is not limited to this position. For example, in the case where an insulating coating 20 is formed by forming a plurality of insulating layers on a conductor 10, the inspection part 153 may be arranged, instead of the position immediately before an insulated electric wire is coiled in the coiling part 156 or in addition to the position immediately before an insulated electric wire is coiled in the coiling part 156, at a position at which an electrostatic capacity can be detected at a stage of an intermediate product before the insulating coating 20 is completed.

In the embodiments described above, the lengths of the guard electrodes in the longitudinal direction of the conductor 10 are equal to each other. However, the lengths of the guard electrodes may be different from each other. Alternatively, the guard electrodes may be omitted within a range that does not affect the detection of a defective portion.

In the embodiments described above, the insulating coatings 20 and 25 are formed by a method in which a varnish applied to surfaces of the conductors 10 and 12 is heated in a baking furnace. However, the method for forming the insulating coatings 20 and 25 is not limited to this method. For example, the insulating coatings 20 and 25 can be formed by extrusion molding of a thermoplastic resin. Regarding a method for forming the pores 15, not only a method for forming pores 15 utilizing decomposition of a thermally decomposable resin but also other methods can be employed. For example, the pores 15 can also be formed in the insulating coating 20 by using a phase separation method (a method for forming a large number of pores, the method including performing microphase separation from a homogeneous solution of a polymer and a solvent, and subsequently removing the solvent by extraction) or a supercritical method (a method for forming a porous body by using a supercritical fluid).

INSPECTION EXAMPLES

Next, a description will be made of examples in which a defective portion of an insulating coating 20 was actually inspected by using a capacitance sensor 2 on the basis of a method for inspecting an insulated electric wire 1 of the present application.

[Detection Examples of Low-Porosity Portion in Insulated Electric Wire Including Insulating Coating 20 Having Pores]

Inspection Example 1

A defect-free insulated electric wire 1 that included a conductor 10 and an insulating coating 20 covering the conductor 10 was prepared. A hole having a square shape with a side of 0.5 mm when viewed in plan from the insulating coating 20 side was formed in the insulating coating 20. The hole was filled with an epoxy resin (dielectric constant: about 3.1) to prepare measurement sample A that artificially had a low-porosity portion 21. The product of the maximum length in the longitudinal direction and the maximum length in the width direction of the low-porosity portion 21 in measurement sample A is 0.25 mm$^2$. Similarly, a hole having a square shape with a side of 0.4 mm when viewed in plan from the insulating coating 20 side was formed in the insulating coating 20. The hole was filled with the same epoxy resin to prepare measurement sample B that artificially had a low-porosity portion 21. The product of the maximum length in the longitudinal direction and the maximum length in the width direction of the low-porosity portion 21 in measurement sample B is 0.16 mm$^2$.

Whether or not the low-porosity portions 21 of measurement sample A and measurement sample B were detected was inspected by using the capacitance sensor 2 including the inspection electrode 55 according to Embodiment 1. According to the results, the low-porosity portions 21 of both measurement sample A and measurement sample B were detected.

Inspection Example 2

Whether or not the low-porosity portions 21 of measurement sample A and measurement sample B were detected was inspected by using the capacitance sensor 2 including the inspection electrode 55 according to Embodiment 3. According to the results, the low-porosity portions 21 of both measurement sample A and measurement sample B were detected.

Inspection Example 3

Whether or not the low-porosity portions 21 of measurement sample A and measurement sample B were detected was inspected by using the capacitance sensor 2 including the inspection electrode 55 according to Embodiment 4. According to the results, the low-porosity portions 21 of both measurement sample A and measurement sample B were detected.

Inspection Example 4

Whether or not the low-porosity portions 21 of measurement sample A and measurement sample B were detected was inspected by using the capacitance sensor 2 including the inspection electrode 55 according to Embodiment 5. According to the results, the low-porosity portions 21 of both measurement sample A and measurement sample B were detected.

As described above, it was proved that the low-porosity portion 21 having a square shape with a side of 0.5 mm in plan view and having a product of the maximum length in the longitudinal direction and the maximum length in the width direction of 0.25 mm² and the low-porosity portion 21 having a square shape with a side of 0.4 mm in plan view and having a product of the maximum length in the longitudinal direction and the maximum length in the width direction of 0.16 mm² could be detected in each of the inspection examples.

[Detection Examples of Thin-Wall Portion]

Next, insulated electric wires 3 having thin-wall portions 22 with various sizes were prepared, and whether or not the thin-wall portions 22 could be detected was examined by the inspection method described above (Inspection Example 5 to Inspection Example 9). In each of the inspection examples, an electrostatic capacity between an electrode having the structure illustrated in FIG. 6 and an insulated electric wire 3, which is a measurement target, was measured while transporting the insulated electric wire 3 in the longitudinal direction of a conductor 12, and a change in the electrostatic capacity was examined. Table 1 shows the results. In Table 1, the amount of variation in the electrostatic capacity refers to an amount (%) of variation in the electrostatic capacity in a portion where a defective portion is present relative to a value of the electrostatic capacity in a defect-free normal portion of an insulating coating 25. The amount (μm) of decrease in the film thickness refers to an average of an amount of decrease in the film thickness in a thin-wall portion relative to an average of the film thickness of the insulating coating 25 in a normal portion (the average of the amount d of decrease in the film thickness in one defect in FIG. 10). The maximum length (L) (mm) in the longitudinal direction refers to a maximum length of a defective portion in the longitudinal direction (the length $L_{D2}$ in FIG. 11) in a planar shape when viewed in plan from the thickness direction of the insulating coating 25. The maximum length (W) (mm) in the width direction refers to a maximum length of a defective portion in the width direction (the width $W_2$ in FIG. 11) in a planar shape when viewed in plan from the thickness direction of the insulating coating 25. The height (μm) of expansion of the conductor 12 refers to a maximum of an amount of bulging of the conductor 12 in a portion in which a thin-wall portion 22 is generated.

TABLE 1

| No. | Inspection Example | | | | |
|---|---|---|---|---|---|
|  | 5 | 6 | 7 | 8 | 9 |
| Amount (%) of variation in electrostatic capacity | 3.6 | 3.4 | 3.0 | 4.8 | 4.3 |
| Amount (μm) of decrease in film thickness | 29 | 22 | 22 | 37 | 32 |
| Maximum length (L) (mm) in longitudinal direction | 8.8 | 3.4 | 3.6 | 16.9 | 1.9 |
| Maximum length (w) (mm) in width direction | 0.9 | 1.5 | 0.8 | 1.0 | 1.5 |
| L × W (mm²) | 7.9 | 5.1 | 2.9 | 16.9 | 2.9 |
| Height (μm) of expansion of conductor | 25 | 20 | 21 | 33 | 32 |

Table 1 showed that, in Inspection Example 5 to Inspection Example 9 in Table 1, variations in the electrostatic capacity were generated in an amount of 3.0% or more and 4.8% at maximum in portions corresponding to the thin-wall portions compared with the values of the electrostatic capacity in the defect-free normal portions. These were amounts of variations enough to detect defective portions. As a result, a thin-wall portion 22 in the insulating coating 25, the thin-wall portion 22 having a length of 4 mm or less in the longitudinal direction of the conductor 12, can be appropriately detected. The results shown in Table 1 show that a thin-wall portion 22 having a product L×W of the maximum length L in the longitudinal direction and the maximum length W in the width direction of 0.1 mm² or more and 20 mm² or less and having an amount of decrease in the film thickness of 1 μm or more and 50 μm or less can be appropriately detected by the inspection method described above.

[Inspection Examples Based on Relationship Between Electrostatic Capacity and Porosity of Insulating Coating 20]

Figure 26:
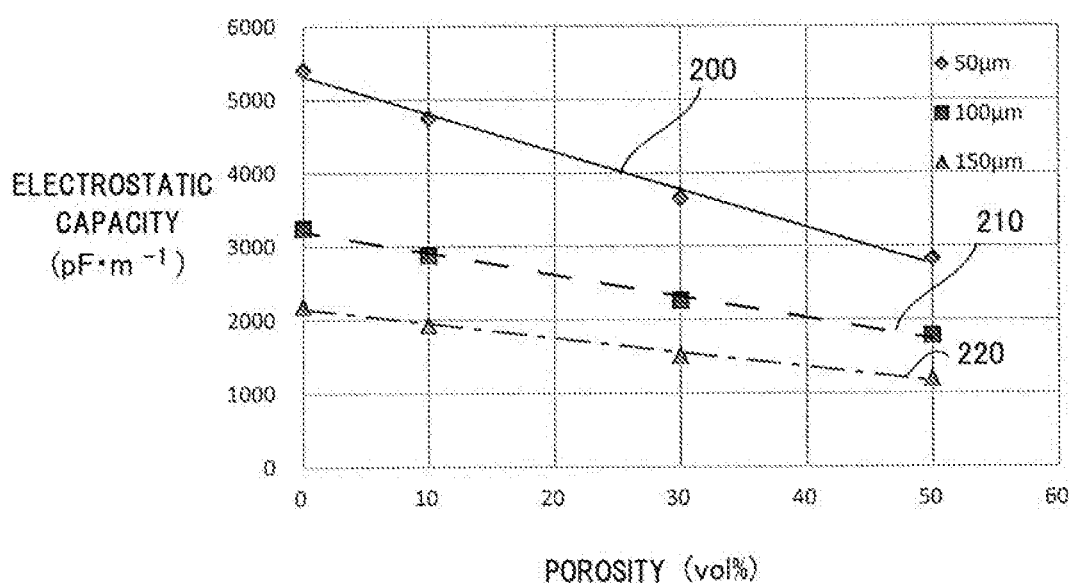
FIG. 26 is a graph showing the relationship between a porosity and an electrostatic capacity.

Next, an example of an inspection of the formation state of an insulating coating 20 performed in this embodiment will be described with reference to FIG. 26. FIG. 26 is a graph showing the relationship between an electrostatic capacity and a porosity. The vertical axis represents the electrostatic capacity (unit: pF·m⁻¹). The horizontal axis represents the porosity (vol % (% by volume)). The rhombic (◆) sign denotes data when the insulating coating 20 has a film thickness of 50 μm. The square (■) sign denotes data when the insulating coating 20 has a film thickness of 100 μm. The triangular (▲) sign denotes data when the insulating coating 20 has a film thickness of 150 μm. A solid line 200 is a straight line obtained by linearly approximating the data when the insulating coating 20 has a film thickness of 50 μm. A dashed line 210 is a straight line obtained by linearly approximating the data when the insulating coating 20 has a film thickness of 100 μm. A dash-dotted line 220 is a straight line obtained by linearly approximating the data when the insulating coating 20 has a film thickness of 150 μm.

If the film thickness of the insulating coating 20 is known, the porosity of the insulating coating 20 included in an insulated electric wire 1 can be estimated from the measured electrostatic capacity by referring to the solid line 200, the dashed line 210, or the dash-dotted line 220 shown in FIG. 26 in accordance with the film thickness of the insulating coating 20. The formation state of the insulating coating 20 can be inspected from the estimated porosity. If the porosity is known, the film thickness of the insulating coating 20 can be estimated by measuring the electrostatic capacity of the sample.

CONCLUSION

As described above, according to the method for producing an insulated electric wire, defective portions that can affect insulating properties of insulated electric wires 1 and 3, in particular, very small defective portions can be appropriately detected in a non-destructive manner while transporting the insulated electric wires, and consequently, insulated electric wires 1 and 3 having stable qualities can be produced. According to the method for inspecting an insulated electric wire of the present application, defective portions inside insulated electric wires 1 and 3, the defective portions being capable of affecting insulating properties of the insulated electric wires 1 and 3 that include insulating coatings 20 and 25, respectively, in particular, very small low-porosity portions 21 and thin-wall portions 22 each having a length of 4 mm or less, preferably 2 mm or less, and more preferably 1 mm or less in the longitudinal direction of conductors 10 and 12 can be appropriately detected, and consequently, the method can contribute to the production of insulated electric wires 1 and 3 having stable qualities.

It is to be understood that the embodiments and inspection examples disclosed herein are only illustrative in all respects and non-restrictive in every aspect. The scope of the present invention is defined not by the meaning described above but by the claims described below. The scope of the present invention is intended to cover all the modifications within the meaning and range of equivalency of the claims.

REFERENCE SIGNS LIST 1 insulated electric wire, 2 capacitance sensor, 3 insulated electric wire, 10 conductor, 11 expansion, 12 conductor, 15 pore, 18 solid layer, 19 porous layer, insulating coating, 21 low-porosity portion, 22 thin-wall portion, 23 scratch, 24 hole, 25 insulating coating, 30 production apparatus, 40 first main electrode, 40a, 40b, 40c, 40d electrode unit, 41 second main electrode, 41a, 41b, 41c, 41d electrode unit, 42a first guard electrode, 42b second guard electrode, 42c third guard electrode, 44 housing, 50 conducting wire preparation part, 51 element wire supply part, 52 conductor-processing part, 53 inspection part, 54 insulating coating formation part, 54a coating device, 54b baking furnace, 55 inspection electrode, 56 coiling part, 58 capacitance monitor, 60 third main electrode, 60a, 60b, 60c, 60d electrode unit, 62a fourth guard electrode, 62b fifth guard electrode, 70 fourth main electrode, 71 fifth main electrode, 72a sixth guard electrode, 72b seventh guard electrode, 72c eighth guard electrode, 80 sixth main electrode, 82a ninth guard electrode, 82b tenth guard electrode, 90 seventh main electrode, 90a electrode unit, 90b electrode unit, 90c electrode unit, 90d electrode unit, 91 eighth main electrode, 91a electrode unit, 91b electrode unit, 91c electrode unit, 91d electrode unit, 92a eleventh guard electrode, 92b twelfth guard electrode, 92c thirteenth guard electrode, 100 ninth main electrode, 101 tenth main electrode, 102a fourteenth guard electrode, 102b fifteenth guard electrode, 102c sixteenth guard electrode, 110 eleventh main electrode, 110a, 110b, 110c, 110d electrode unit, 112a seventeenth guard electrode, 112b eighteenth guard electrode, 130 production apparatus, 141 main electrode, 142a first guard electrode, 142b second guard electrode, 144 housing, 150 conducting wire preparation part, 151 element wire supply part, 152 conducting wire-processing part, 153 inspection part, 154 insulating coating formation part, 154a coating device, 154b baking furnace, 156 coiling part, 158 capacitance monitoring device, 200 solid line, 210 dashed line, 220 dash-dotted line.

The invention claimed is:

1. A method for producing an insulated electric wire, comprising:
preparing a conductor having a linear shape;
forming an insulating coating so as to cover a surface on an outer peripheral side of the conductor thereby obtaining an insulated electric wire that includes the conductor and the insulating coating covering the conductor, the insulating coating being formed with porosity; and
measuring electrostatic capacity between the insulated electric wire and a first electrode disposed outside in a radial direction of the insulated electric wire, the first electrode facing an outer peripheral surface of the insulated electric wire while transporting the insulated electric wire with its insulating coating in a longitudinal direction of the conductor thereby inspecting a formation state of the insulating coating in order to identify defective portions in the insulating coating in response to measured changes in the electrostatic capacity, where the defective portions have a low-porosity as compared with the porosity of the remainder of the insulating coating.

2. The method for producing an insulated electric wire according to claim 1, wherein in the inspecting of the formation state of the insulating coating includes detecting the defective portion in the insulating coating with the defective portion-having a length of 4 mm or less in the longitudinal direction of the conductor.

3. The method for producing an insulated electric wire according to claim 2, wherein in the inspecting of the formation state of the insulating coating, a length of the first electrode in the longitudinal direction is configured for adjustment such that the defective portion having a length of 4 mm or less in the longitudinal direction of the conductor is detectable.

4. The method for producing an insulated electric wire according to claim 1, wherein in the inspecting of the formation state of the insulating coating, the defective portion having a length of 2 mm or less in the longitudinal direction of the conductor, is detectable.

5. The method for producing an insulated electric wire according to claim 1, wherein in the obtaining of the insulated electric wire, the insulating coating is formed by applying a coating liquid so as to cover the surface on the outer peripheral side of the conductor to form a coating film and further includes heating the coating film.

6. The method for producing an insulated electric wire according to claim 1, wherein the defective portion in the insulating coating is a thin-wall portion that is thinner than a remainder of the insulating coating.

7. The method for producing an insulated electric wire according to claim 6, wherein the thin-wall portion has an amount of decrease in a film thickness of 1 μm or more and 50 μm or less.

8. The method for producing an insulated electric wire according to claim 1, wherein the first electrode includes a plurality of units which are divided so as to be separated from each other in a circumferential direction of the conductor in a section perpendicular to the longitudinal direction of the conductor, and each of the units extends in the longitudinal direction of the conductor.

9. The method for producing an insulated electric wire according to claim 1, wherein in the inspecting of the formation state of the insulating coating includes measuring a first electrostatic capacity between the first electrode and the insulated electric wire and further includes measuring a second electrostatic capacity between a second electrode and the insulated electric wire, the second electrode being disposed outside in the radial direction of the insulated electric wire so as to face the outer peripheral surface of the insulated electric wire, and the formation state of the insulating coating is inspected on the basis of at least one of a change in the first electrostatic capacity and a change in the second electrostatic capacity.

10. The method for producing an insulated electric wire according to claim 9, wherein a length of the second electrode in the longitudinal direction of the conductor is different from that of the first electrode.

11. The method for producing an insulated electric wire according to claim 9, wherein the second electrode includes a plurality of units which are divided so as to be separated from each other in a circumferential direction of the conductor in a section perpendicular to the longitudinal direction of the conductor, and each of the units extends in the longitudinal direction of the conductor.

12. The method for producing an insulated electric wire according to claim 1, wherein the insulating coating contains polyimide.

13. The method for producing an insulated electric wire according to claim 1, wherein the step of inspecting the formation state of the insulating coating is performed online.

14. A method for inspecting an insulated electric wire, comprising:
- preparing an insulated electric wire that includes a conductor having a linear shape and an insulating coating having porosity formed on an outer peripheral side of the conductor; and
- measuring an electrostatic capacity between the insulated electric wire and an electrode disposed outside in a radial direction of the insulated electric wire so as to face an outer peripheral surface of the insulated electric wire while transporting the insulated electric wire in a longitudinal direction of the conductor, and
- inspecting a formation state of the insulating coating on the basis of a relationship between electrostatic capacity and porosity of the insulated coating,
- wherein in the inspecting of the formation state of the insulating coating includes detecting a defective portion in the insulating coating, with the defective portion having a low-porosity as compared with the porosity of the remainder of the insulating coating, the defective portion also having a length of 4 mm or less in the longitudinal direction of the conductor.

15. The method for inspecting an insulated electric wire according to claim 14, wherein a length of the electrode in the longitudinal direction is adjusted such that the defective portion in the insulating coating having a low-porosity portion is detectable with the defective portion having a length of 4 mm or less in the longitudinal direction of the conductor.

16. The method for inspecting an insulated electric wire according to claim 14, wherein in the inspecting of the formation state of the insulating coating includes detecting the defective portion in the insulating coating, with the defective portion having a length of 2 mm or less in the longitudinal direction of the conductor.

17. The method for inspecting an insulated electric wire according to claim 14, wherein the defective portion in the insulating coating is a thin-wall portion.

18. The method for inspecting an insulated electric wire according to claim 17, wherein the thin-wall portion has an amount of decrease in a film thickness of 1 μm or more and 50 μm or less.

19. The method for inspecting an insulated electric wire according to claim 14, wherein the insulating coating contains polyimide.

20. The method for inspecting an insulated electric wire according to claim 14, wherein the inspecting of the formation state of the insulating coating is performed online.

* * * * *